(12) United States Patent
Liang et al.

(10) Patent No.: US 11,476,492 B2
(45) Date of Patent: Oct. 18, 2022

(54) DEVICE FOR PREPARING ELECTRODE ASSEMBLY AND PREPARATION METHOD OF ELECTRODE ASSEMBLY

(71) Applicant: Contemporary Amperex Technology Co., Limited, Ningde (CN)

(72) Inventors: Chengdu Liang, Ningde (CN); Yiruo Wang, Ningde (CN); Chao Yang, Ningde (CN); Minghao Tang, Ningde (CN); Xiao Wang, Ningde (CN); Jiang Lin, Ningde (CN); Chuangchuang Xiang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/058,463

(22) PCT Filed: Jun. 2, 2020

(86) PCT No.: PCT/CN2020/094038
§ 371 (c)(1),
(2) Date: Nov. 24, 2020

(87) PCT Pub. No.: WO2021/243582
PCT Pub. Date: Dec. 9, 2021

(65) Prior Publication Data
US 2021/0376371 A1  Dec. 2, 2021

(51) Int. Cl.
*H01M 10/04* (2006.01)

(52) U.S. Cl.
CPC ... *H01M 10/0431* (2013.01); *H01M 10/0468* (2013.01)

(58) Field of Classification Search
CPC ... H01M 10/04–0409; H01M 10/0431; H01M 10/0468; H01M 10/058; H01M 10/0587
See application file for complete search history.

(56) References Cited

U.S. PATENT DOCUMENTS

| | | | |
|---|---|---|---|
| 2,737,859 A | * | 3/1956 | Allison ............... B29C 65/7433 493/194 |
| 5,534,369 A | | 7/1996 | Nagaura |

(Continued)

FOREIGN PATENT DOCUMENTS

| CN | 101188308 A | 5/2008 |
|---|---|---|
| CN | 108063276 A | 5/2018 |

(Continued)

OTHER PUBLICATIONS

Machine translations of Yamada et al. (JP 2012-151064). Originally published Aug. 9, 2012 (Year: 2012).*

(Continued)

*Primary Examiner* — Jonathan Crepeau
*Assistant Examiner* — Jacob Buchanan
(74) *Attorney, Agent, or Firm* — Sterne, Kessler, Goldstein & Fox P.L.L.C.

(57) ABSTRACT

The present application relates to a device for preparing an electrode assembly and a preparation method of the electrode assembly. Wherein the device for preparing the electrode assembly includes: a winding assembly; a plurality of first electrode plate unwinding apparatuses, configured to provide a plurality of first electrode plates for the winding assembly; and at least one second electrode plate unwinding apparatus, configured to provide at least one second electrode plate for the winding assembly, wherein a polarity of the first electrode plate is opposite to a polarity of the second electrode plate; and wherein the winding assembly is configured to wind the plurality of first electrode plates and the at least one second electrode plate, to form an electrode assembly. The present application is used for improving winding efficiency of the electrode assembly.

16 Claims, 9 Drawing Sheets

(56) References Cited

U.S. PATENT DOCUMENTS

| | | | |
|---|---|---|---|
| 2006/0127751 A1 | 6/2006 | Woo | |
| 2007/0180686 A1* | 8/2007 | Woo | H01M 10/0587 29/623.1 |
| 2012/0281339 A1 | 11/2012 | Mizukami et al. | |
| 2016/0036085 A1* | 2/2016 | Choi | H01M 10/0409 242/530 |
| 2018/0158624 A1* | 6/2018 | Kaito | H01G 11/84 |
| 2019/0356022 A1 | 11/2019 | Shibata et al. | |

FOREIGN PATENT DOCUMENTS

| | | | | |
|---|---|---|---|---|
| CN | 108400369 A | | 8/2018 | |
| CN | 109301339 A | | 2/2019 | |
| CN | 111180804 A | | 5/2020 | |
| CN | 210468000 U | | 5/2020 | |
| JP | 7-249429 A | | 9/1995 | |
| JP | 07240207 A | * | 9/1995 | H01M 10/04 |
| JP | 8-127445 A | | 5/1996 | |
| JP | 2000-90977 A | | 3/2000 | |
| JP | 2007-329059 A | | 12/2007 | |
| JP | 2009-193750 A | | 8/2009 | |
| JP | 2012151064 A | * | 8/2012 | H01M 10/04 |
| JP | 2017-117685 A | | 6/2017 | |
| KR | 10-2015-0000661 A | | 1/2015 | |
| KR | 20160123457 A | | 10/2016 | |
| WO | WO-2009122245 A1 | * | 10/2009 | B65H 39/16 |

OTHER PUBLICATIONS

Machine translation of Minafuji, JP 7-240207. Originally published Sep. 12, 1995 (Year: 1995).*

Extended European Search Report issued in European Application No. 20803072.6, dated Sep. 2, 2021, 10 pages.

* cited by examiner

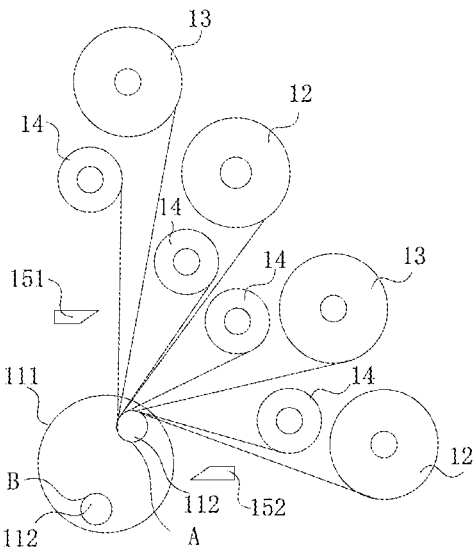
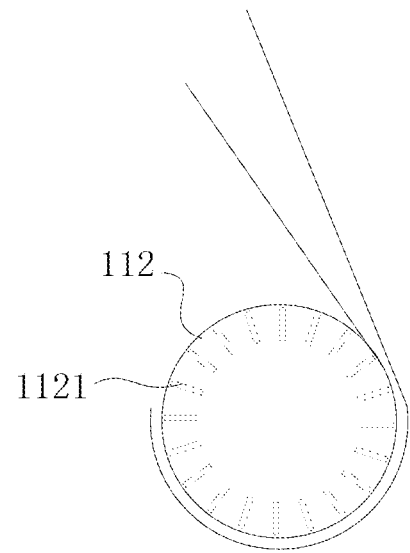
Fig. 8                     Fig. 9
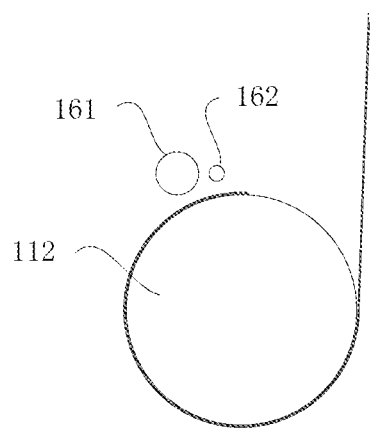
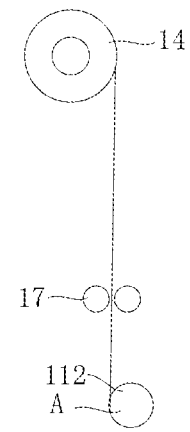
Fig. 10                    Fig. 11

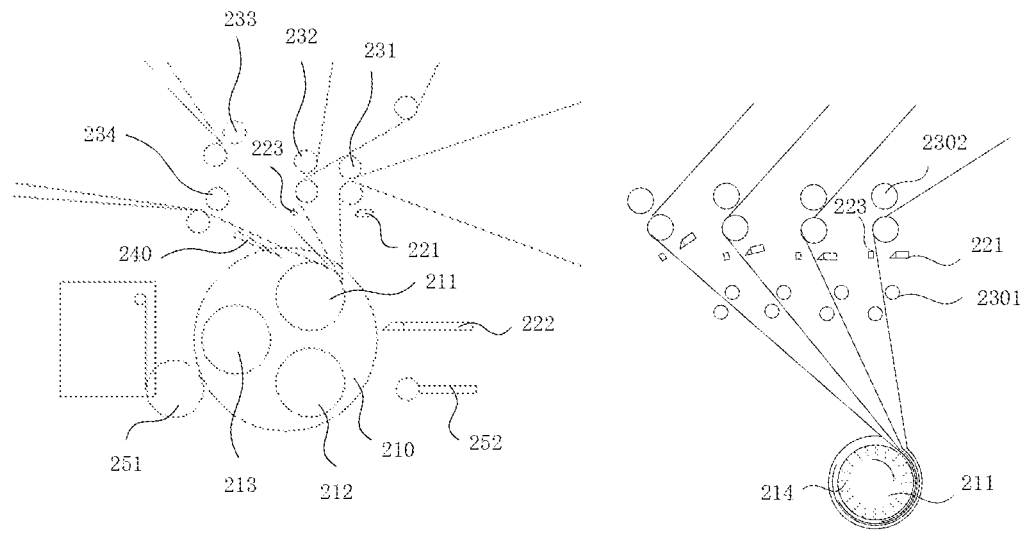
Fig. 18
Fig. 19
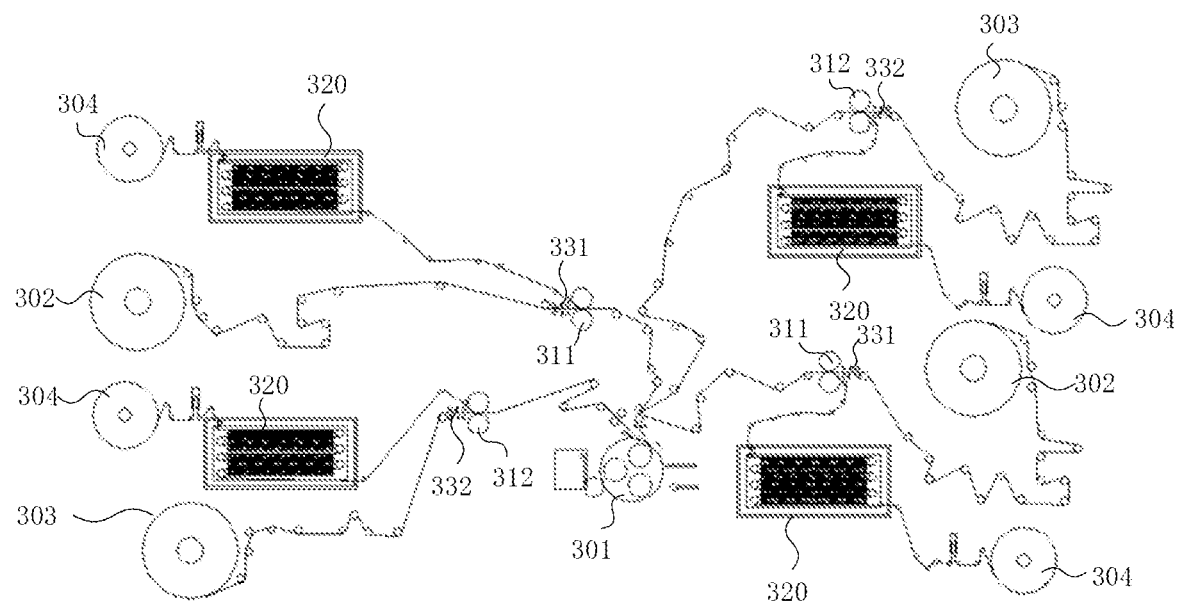
Fig. 20

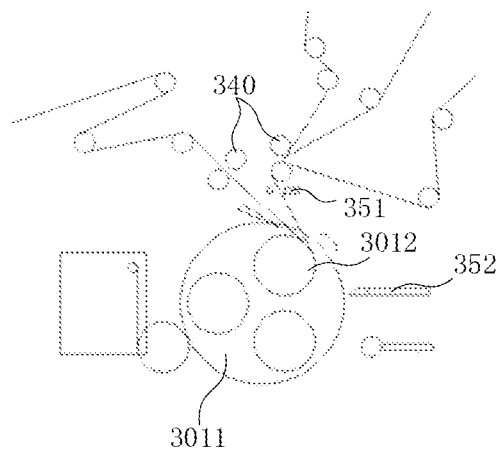
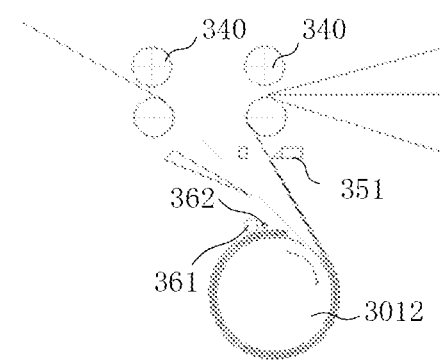
Fig. 21　　　　　　　　　　Fig. 22
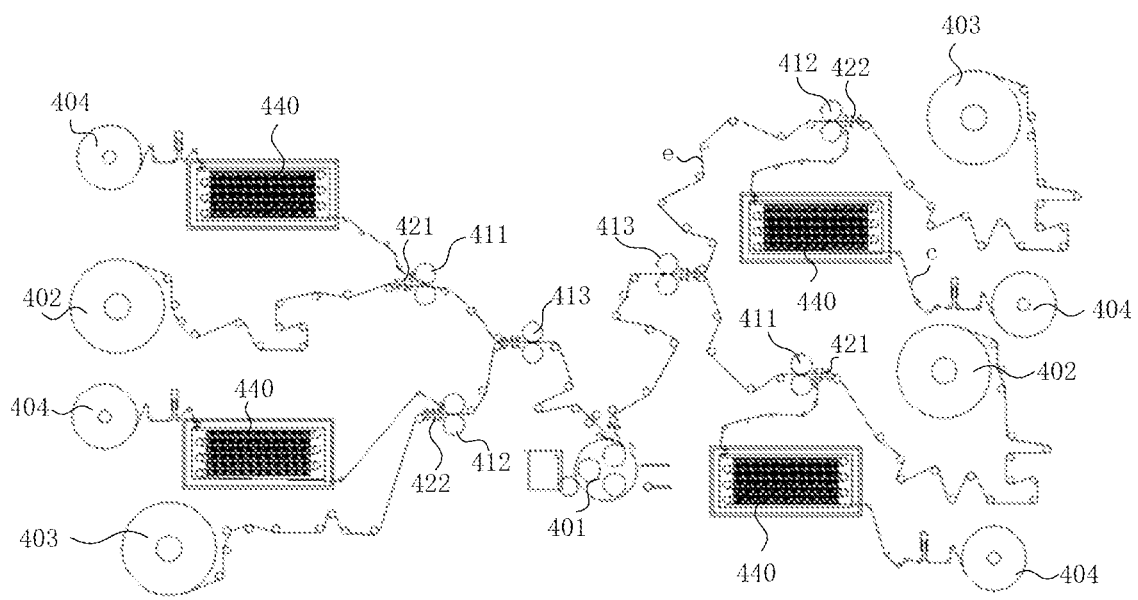
Fig. 23

DEVICE FOR PREPARING ELECTRODE ASSEMBLY AND PREPARATION METHOD OF ELECTRODE ASSEMBLY

TECHNICAL FIELD

The present application relates to the field of batteries, in particular to a device for preparing an electrode assembly and a preparation method of the electrode assembly.

BACKGROUND

In the related art, in the preparation of a battery, a positive electrode plate and a negative electrode plate need to be wound to form an electrode assembly, and then the electrode assembly is placed into a housing of a battery to form a battery. Winding is an important part in the preparation process of a battery, and those skilled in the art have been working to improve the efficiency of winding.

SUMMARY

Some embodiments of the present application provide a device for preparing an electrode assembly and a preparation method of the electrode assembly, to improve the winding efficiency.

Some embodiments of the present application provide a device for preparing the electrode assembly, including:

a winding assembly;

a plurality of first electrode plate unwinding apparatuses, configured to provide a plurality of first electrode plates for the winding assembly; and at least one second electrode plate unwinding apparatus, configured to provide at least one second electrode plate for the winding assembly, wherein a polarity of the first electrode plate is opposite to a polarity of the second electrode plate; and wherein the winding assembly is configured to wind the plurality of first electrode plates and the at least one second electrode plate to form an electrode assembly.

In some embodiments, the device for preparing an electrode assembly further includes a plurality of separator unwinding apparatuses configured to provide a plurality of separators for the winding assembly, the separators configured to isolate the first electrode plates from the second electrode plates.

In some embodiments, the winding assembly includes a winding core, and the winding core is configured to wind the plurality of first electrode plates, the at least one second electrode plate and the plurality of separators.

In some embodiments, the winding core is provided with at least one negative pressure opening to adsorb a winding initial section of at least one separator in the plurality of separators.

In some embodiments, the negative pressure opening includes a concave hole or a penetrating hole arranged on a winding surface of the winding core.

In some embodiments, the negative pressure opening is triangular, circular, square or of irregular shapes.

In some embodiments, the negative pressure openings are distributed in an array on the winding surface of the winding core.

In some embodiments, the device for preparing the electrode assembly further includes:

a press roller, configured to press a winding initial section of at least one separator in the plurality of separators towards the winding core; and a spraying and blowing mechanism, configured to blow an end part of the winding initial section onto the surface of the winding core, such that the winding core winds the winding initial section, to drive the plurality of first electrode plates, the at least one second electrode plate and the plurality of separators to be wound.

In some embodiments, the winding assembly further includes a switching apparatus, the winding core is arranged on the switching apparatus, and the switching apparatus is configured to switch the winding core between a loading station and an unloading station.

In some embodiments, the device for preparing an electrode assembly further includes:

a first cutter, configured to cut off at least one separator in the plurality of separators and retain at least one separator when the winding core winds the electrode assembly for a predetermined number of turns; or a second cutter, configured to cut off the at least one retained separator when the winding core is at the unloading station.

In some embodiments, the device for preparing an electrode assembly further includes a first loading piece configured to feed a winding initial section of at least one separator in the plurality of separators into the winding core.

In some embodiments, the device for preparing an electrode assembly further includes a second loading piece configured to clamp at least one cut-off separator when at least one separator in the plurality of separators is cut off.

In some embodiments, the device for preparing an electrode assembly further includes:

a plurality of first compound mechanisms, wherein each first compound mechanism in the plurality of first compound mechanisms is configured to compound one first electrode plate in the plurality of first electrode plates and one separator in the plurality of separators into a first compound electrode plate;

at least one second compound mechanism, wherein each second compound mechanism in the at least one second compound mechanism is configured to compound one second electrode plate in the at least one second electrode plate and another separator in the plurality of separators into a second compound electrode plate, and the winding assembly is configured to wind all the first compound electrode plates and all the second compound electrode plates to form an electrode assembly.

In some embodiments, the device for preparing an electrode assembly further includes at least one third compound mechanism, and each third compound mechanism in the at least one third compound mechanism is configured to compound one first electrode plate in the plurality of first electrode plates, one second electrode plate in the at least one second electrode plate and two separators in the plurality of separators into a third compound electrode plate; and the winding assembly is configured to wind all the third compound electrode plates to form an electrode assembly.

In some embodiments, the device for preparing an electrode assembly further includes a fourth compound mechanism configured to compound the plurality of first electrode plates, the at least one second electrode plate and the plurality of separators into a fourth compound electrode plate, and the winding assembly is configured to wind the fourth compound electrode plate to form an electrode assembly.

Some embodiments of the present application provide a preparation method of an electrode assembly, including:

providing a plurality of first electrode plates;

providing at least one second electrode plate, wherein a polarity of the first electrode plate is opposite to a polarity of the second electrode plate; and winding the plurality of first electrode plates and at least one second electrode plate to form an electrode assembly.

In some embodiments, the preparation method of the electrode assembly further includes: providing a plurality of separators, wherein the separator is configured to isolate the first electrode plate from the second electrode plate.

In some embodiments, absorbing a winding initial section of at least one separator in the plurality of separators, and winding the plurality of first electrode plates, the at least one second electrode plate and the plurality of separators.

In some embodiments, after a winding initial section of at least one separator in the plurality of separators is fed into a winding core of a winding assembly for a certain length, remaining separators in the plurality of separators are fed into the winding core and driven by the at least one separator to be wound.

In some embodiments, the preparation method of the electrode assembly includes:

each first compound mechanism in a plurality of first compound mechanisms compounds one first electrode plate in the plurality of first electrode plates and one separator in the plurality of separators into a first compound electrode plate;

each second compound mechanism in at least one second compound mechanism compounds one second electrode plate in the at least one second electrode plate and another separator in the plurality of separators into a second compound electrode plate; and a winding assembly winds all the first compound electrode plates and all the second compound electrode plates to form an electrode assembly.

In some embodiments, the preparation method of the electrode assembly includes:

each third compound mechanism in at least one third compound mechanism compounds one first electrode plate in the plurality of first electrode plates, one second electrode plate in the at least one second electrode plate and two separators in the plurality of separators into a third compound electrode plate; and a winding assembly winds all the third compound electrode plates to form an electrode assembly.

In some embodiments, the preparation method of the electrode assembly includes:

a fourth compound mechanism compounds the plurality of first electrode plate, at least one second electrode plate and the plurality of separators into a fourth compound electrode plate, and a winding assembly winds the fourth compound electrode plate to form an electrode assembly.

In the device for preparing the electrode assembly and the preparation method of the electrode assembly described above, as to the device for preparing the electrode assembly, a plurality of first electrode plates and at least one second electrode plate are wound to obtain an electrode assembly with a winding structure, that is, a plurality of first electrode plates are wound simultaneously on the winding assembly, and the length of the first electrode plate obtained after the winding assembly winds for one turn is equivalent to the length of one first electrode plate being wound by the winding assembly for a plurality of turns, thereby reducing the number of winding turns, and improving the winding efficiency of the electrode assembly.

BRIEF DESCRIPTION OF THE DRAWINGS

The drawings described herein provide a further understanding of the present application, and constitute a part of the present application. The exemplary embodiments of the present application and their descriptions are used for interpreting the present application, rather than for constituting an improper limitation to the present application. In the drawings:

FIG. 8 is a schematic diagram of a device for preparing an electrode assembly provided in an eighth embodiment of the present application;

FIG. 9 is a schematic diagram of a winding core with a negative pressure opening provided in some embodiments of the present application;

FIG. 10 is a partial schematic diagram of a device for preparing an electrode assembly provided with a press roller and a spraying and blowing mechanism provided in some embodiments of the present application;

FIG. 11 is a schematic diagram of one of the setting manners of a loading assembly provided in some embodiments of the present application;

FIG. 18 is a partial enlarged schematic diagram of FIG. 17;

FIG. 19 is a schematic diagram of a winding core provided with a negative pressure opening of a device for preparing an electrode assembly provided in a second embodiment of the present application;

FIG. 20 is a schematic diagram of a device for preparing an electrode assembly provided in a third embodiment of the present application;

FIG. 21 is a partial enlarged schematic diagram of FIG. 20;

FIG. 22 is a schematic diagram of a device for preparing an electrode assembly provided with a press roller and a spraying and blowing mechanism provided in a second embodiment of the present application;

FIG. 23 is a schematic diagram of a device for preparing an electrode assembly provided in a fourth embodiment of the present application;

DETAILED DESCRIPTION OF THE EMBODIMENTS

Figure 1:
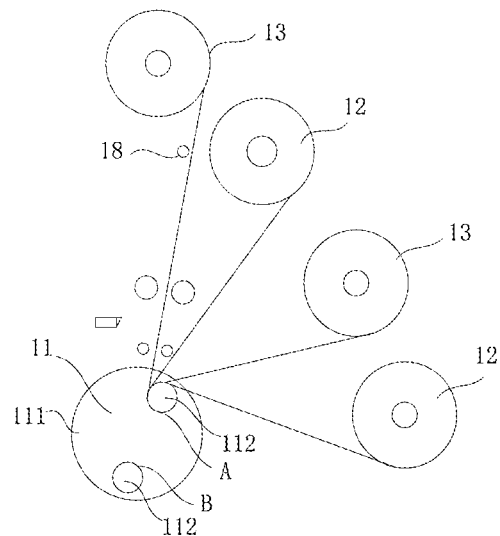
FIG. 1 is a schematic diagram of a device for preparing an electrode assembly provided in a first embodiment of the present application.

A clear and complete description will be given below on the technical solutions in the embodiments in combination with the accompanying drawings in the embodiments of the present application below, and apparently the embodiments described below are only a part but not all of the embodiments of the present application. Based upon the embodiments of the present application, all the other embodiments which can occur to those skilled in the art without any inventive effort shall fall into the protection scope of the present application.

In the description of the present application, it should be understood that, the orientation or positional relationship indicated by such terms as "center", "longitudinal", "lateral", "front", "rear", "left", "right", "vertical", "horizontal", "top", "bottom", "inner" and "outer" is generally based on the orientation or positional relationship shown in the drawings, and is merely for facilitating description of the present application and for simplifying the description, rather than indicating or implying that the device or element referred to must be located in a certain orientation or must be constructed or operated in a certain orientation, therefore, these terms cannot be understood as a limitation to the protection scope of the present application.

Unless otherwise defined, all the technical and scientific terms used in the text have the same meanings as those understood by those skilled in the art in the technical field of the present application; in the present text, the terms used in the applied description are merely for the purpose of describing specific embodiments, rather than for limiting the present application; the terms "including" and "having" and any variation thereof in the description and claims and the above brief description of the drawings of the present application intend to encompass non-exclusive inclusions.

In the description of the present application, it should be understood that, the terms such as "first", "second" and "third" are used to define parts and components, and are merely to facilitate distinguishment of the above parts and components, unless otherwise stated, the above terms have no special meanings, therefore, they cannot be understood as limiting the protection scope of the present application.

The mentioning of "embodiment" in the present text means that specific characteristics, structures or properties described in combination with embodiments can be included in at least one embodiment of the present application. The occurrence of this phrase in various positions in the description does not necessarily refer to the same embodiment, nor refer to independent or alternative embodiment which is mutually exclusive with the other embodiments. Those skilled in the art can explicitly and implicitly understand that, the embodiments described in the text can be combined with other embodiments.

The term "and/or" in the text merely describes an incidence relationship of associated objects, and represents the existence of three relationships, for example, A and/or B can represent: A exists alone, A and B exist simultaneously, B exists alone. In addition, the character "/" in the text generally represents that the front and rear associated objects are of an "or" relationship.

FIG. 1 is a structural schematic diagram of a device for preparing an electrode assembly provided in some embodiments of the present application, and the device for preparing the electrode assembly includes: a winding assembly 11, a plurality of first electrode plate unwinding apparatuses 12 and at least one second electrode plate unwinding apparatus 13.

Each first electrode plate unwinding apparatus 12 in the plurality of first electrode plate unwinding apparatuses 12 is configured to provide a first electrode plate for the winding assembly 11. That is, a plurality of first electrode plate unwinding apparatuses 12 are configured to provide a plurality of first electrode plates for the winding assembly 11.

Each second electrode plate unwinding apparatus 13 in the at least one second electrode plate unwinding apparatus 13 is configured to provide a second electrode plate for the winding assembly 11. That is, at least one second electrode plate unwinding apparatus 13 is configured to provide at least one second electrode plate for the winding assembly 11.

A polarity of the first electrode plate is opposite to a polarity of the second electrode plate.

The winding assembly 11 is configured to wind a plurality of first electrode plates and at least one second electrode plate to form an electrode assembly.

Each electrode assembly includes a plurality of first electrode plates and at least one second electrode plate which are superimposed along a direction vertical to a winding axial direction of the winding assembly.

In another embodiment of the present application, a plurality of first electrode plate unwinding apparatuses 12 and at least one second electrode plate unwinding apparatus 13 are distributed along the periphery of the winding assembly 11, such that the respectively provided electrode plates do not wind before entering the winding assembly 11.

The number of the plurality of first electrode plates and the at least one second electrode plate included in the electrode assembly is same or different optionally, for example, one electrode assembly includes 2, 3, 4 or 5 first electrode plates and 1, 2, 3 or 4 second electrode plates. To simplify the description, in the following embodiments, the number of the first electrode plates being the same as the number of the second electrode plates is taken as an example for illustration.

In another embodiment of the present application, the shape of each first electrode plate is basically the same as the shape of each second electrode plate, for example, after a winding structure of the electrode assembly is flattened, the first electrode plate and the second electrode plate are basically strip-shaped, for example, the first electrode plate and the second electrode plate is strip-shaped with a length of 5-20 m, the length difference between the first electrode plate and the second electrode plate is within a preset range, and the width sizes are basically the same. After a plurality of first electrode plates and at least one second electrode plate are superimposed, an electrode assembly with the winding structure can be obtained when the plurality of first electrode plates and at least one second electrode plate are wound along a strip direction, the winding structure is provided with a winding axis, and the superimposing surface in which the plurality of first electrode plates and at least one second electrode plate are superimposed is basically in parallel with the winding axis.

In another embodiment of the present application, a plurality of first electrode plates and at least one second electrode plate included in the electrode assembly can be superimposed in a plurality of forms, for example, in the winding structure of the electrode assembly, one first electrode plate and one second electrode plate can be alternately superimposed in sequence, or every two or more first electrode plates and one second electrode plate can be alternately superimposed in sequence, or one first electrode plate and every two or more second electrode plates can be alternately superimposed in sequence. The superimposing of a plurality of first electrode plates and at least one second electrode plate in the electrode assembly can also be understood as follows: at least one second electrode plate is included between every two adjacent first electrode plates, or, at least one first electrode plate is included between every two adjacent second electrode plates.

In another embodiment of the present application, when no other electrode plates with different polarities exist between two or more electrode plates with the same polarity, the two or more electrode plates with the same polarity can be taken as one group of electrode plates, when the electrode plates are superimposed, the electrode plate group of the same polarity and another electrode plate group with different polarities or a single electrode plate are alternately superimposed in sequence, for example, two or more positive electrode plates form a group of positive electrode plate group, and two or more negative electrode plates form a negative electrode plate group. The superimposing can be as follows: the positive electrode plate group and the negative electrode plate group are alternately superimposed in sequence, and the positive electrode plate group and a single negative electrode plate are alternately superimposed in sequence, or, the negative electrode plate group and a single positive electrode plate are alternately superimposed in sequence.

Since the electrode plate group of the same polarity can be taken as one electrode plate, therefore, to facilitate description, one electrode plate described subsequently can be not only a single electrode plate, but also an electrode plate group formed by a plurality of electrode plates with the same polarity.

In another embodiment of the present application, two electrode plates with the same polarity being adjacent means that only one electrode plate with other polarity exists between the two electrode plates with the same polarity, for example, two first electrode plates being adjacent means that only one second electrode plate exists between the two first electrode plates, and two second electrode plates being adjacent means that only one first electrode plate exists between the two second electrode plates.

In some embodiments of the present application, the first electrode plate is a positive electrode plate with an insulating layer, the second electrode plate is a negative electrode plate with an insulating layer, and the positive electrode plate is isolated from the negative electrode plate through an insulating layer, to prevent short circuit.

In some other embodiments of the present application, the first electrode plate is a negative electrode plate with an insulating layer, the second electrode plate is a positive electrode plate with an insulating layer, and the positive electrode plate is isolated from the negative electrode plate through an insulating layer, to prevent short circuit.

In still some other embodiments of the present application, the first electrode plate and the second electrode plate can also be electrode plates with no insulating layer, and the electrode plates with opposite polarities can be isolated through a separator, to prevent short circuit.

In some embodiments of the present application, the winding assembly 11 includes a winding core 112, and the winding core 112 is configured to wind a plurality of first electrode plates and at least one second electrode plate.

In some other embodiments of the present application, the winding assembly 11 includes a switching apparatus 111, the winding core 112 is arranged on the switching apparatus 111, and the switching apparatus 111 is configured to switch the winding core 112 between a loading station and an unloading station. The winding core 112 is configured to wind a plurality of first electrode plates and at least one second electrode plate corresponding to the loading station at the corresponding loading station to form an electrode assembly with a winding structure. The unloading station can refer to a station at which an electrode assembly is uninstalled from the winding core 112, and can also refer to the next station at which other processes still need to be performed after the electrode assembly finishes winding, wherein other processes can be tape attaching, etc.

For example, the switching apparatus 111 is provided with two winding cores 112, one of the winding cores 112 is correspondingly arranged at the loading station A, while the other winding core 112 is correspondingly arranged at the unloading station B. The number of the winding cores 112 on the switching apparatus 111 is not limited, and the winding cores 112 can be added according to actual requirements.

In some other embodiments of the present application, the device for preparing the electrode assembly includes at least one tension mechanism 18, and the tension mechanism 18 is configured to adjust the tensile force of the first electrode plate and/or the second electrode plate.

Figure 2:
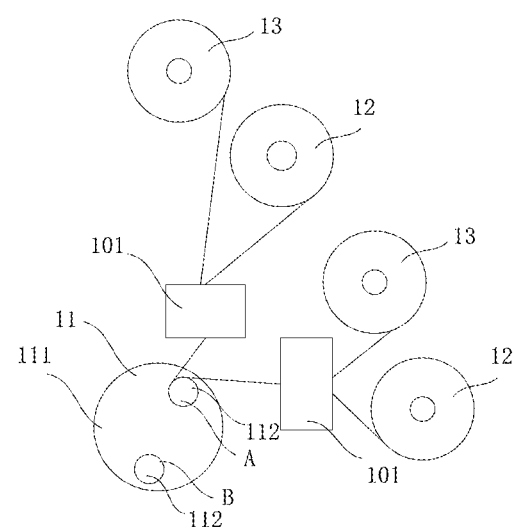
FIG. 2 is a schematic diagram of a device for preparing an electrode assembly provided in a second embodiment of the present application.

As shown in FIG. 2, in some other embodiments of the present application, the device for preparing the electrode assembly includes at least one first compound mechanism 101, the first compound mechanism 101 is configured to compound the at least one first electrode plate and at least one second electrode plate to form a first compound electrode plate, and the winding assembly 11 is configured to wind all the first compound electrode plates.

Figure 3:
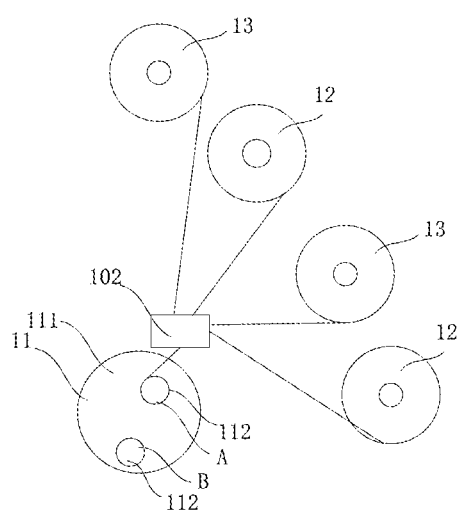
FIG. 3 is a schematic diagram of a device for preparing an electrode assembly provided in a third embodiment of the present application.

As shown in FIG. 3, in still some other embodiments of the present application, the device for preparing the electrode assembly includes at least one second compound mechanism 102, the second compound mechanism 102 is configured to compound all the first electrode plates and all the second electrode plates to form a second compound electrode plate, and the winding assembly 11 is configured to wind all the second compound electrode plates.

Figure 4:
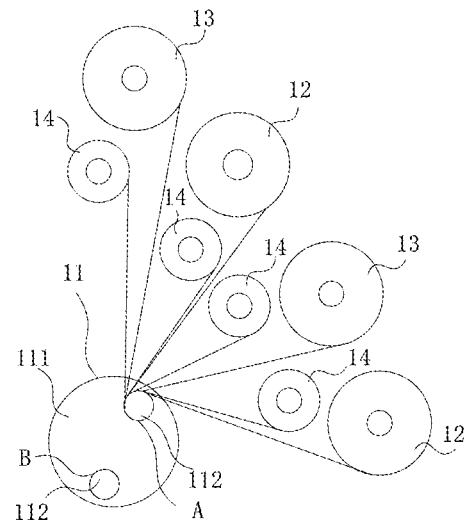
FIG. 4 is a schematic diagram of a device for preparing an electrode assembly provided in a fourth embodiment of the present application.

As shown in FIG. 4, the device for preparing the electrode assembly further includes a plurality of separator unwinding apparatuses 14, wherein the plurality of separator unwinding apparatuses 14 are configured to provide a plurality of separators for the winding assembly 11, and the separators are configured to isolate the first electrode plates from the second electrode plates, to prevent short circuit.

Each electrode assembly includes at least a plurality of first electrode plates, at least one second electrode plate and a plurality of separators which are superimposed along a direction vertical to a winding axial direction of a winding structure, wherein adjacent first electrode plate and second electrode plate are isolated through at least one separator.

In another embodiment of the present application, a plurality of first electrode plate unwinding apparatuses 12, at least one second electrode plate unwinding apparatus 13 and a plurality of separator unwinding apparatuses 14 are distributed along the periphery of the winding assembly 11, such that the respectively provided electrode plates and separators do not wind before entering the winding assembly 11.

In still another embodiment of the present application, after a plurality of first electrode plates, at least one second electrode plate and a plurality of separators are superimposed, an electrode assembly with a winding structure can be obtained when a plurality of first electrode plates, at least one second electrode plate and a plurality of separators are wound along a strip direction, the winding structure is provided with a winding axis, and the superimposing surface in which a plurality of first electrode plates, at least one second electrode plate and a plurality of separators are superimposed is basically in parallel with the winding axis.

When a plurality of first electrode plates and at least one second electrode plate of the electrode assembly are superimposed, a separator is further arranged between any adjacent one first electrode plate and one second electrode plate, to isolate the adjacent first electrode plate and the second electrode plate to achieve a purpose of non-mutual short circuit.

In another embodiment of the present application, electrode plates of different polarities are adjacent, that is, the first electrode plate is adjacent to the second electrode plate, this means that no other electrode plate but at least one layer of separator exists between the first electrode plate and the second electrode plate, for example, no other first electrode plate or second electrode plate exists between the first electrode plate and the second electrode plate, and this can also be understood as that the first electrode plate and the second electrode plate are most directly adjacent to each other, for example, with an electrode plate (such as a positive electrode plate) as an example, the electrode plate with the polarity and a first layer of electrode plate with a different polarity (such as a negative electrode plate) adjacent to the electrode plate with the polarity are called adjacent electrode plates.

Regardless of the superimposing manner between the first electrode plate and the second electrode plate, at least one layer of separator is arranged between the first electrode plate and the second electrode plate which are adjacent to each other.

In another embodiment of the present application, the winding assembly 11 includes a winding core 112, and the winding core 112 is configured to wind a plurality of first electrode plates, at least one second electrode plate and a plurality of separators.

In another embodiment of the present application, the winding assembly 11 includes a switching apparatus 111, the winding core 112 is arranged on the switching apparatus 111, and the switching apparatus 111 is configured to switch the winding core 112 between a loading station and an unloading station. The winding core 112 is configured to wind a plurality of first electrode plates, at least one second electrode plate and a plurality of separators corresponding to the loading station A at the corresponding loading station A to form an electrode assembly with a winding structure.

For example, the device for preparing the electrode assembly includes a loading station A and an unloading station B, the switching apparatus 111 is provided with at least one winding core 112, the switching apparatus 111 moves one winding core 112 in the at least one winding core 112 to the loading station A, then the winding core 112 corresponding to the loading station A can wind a plurality of first electrode plates provided by a plurality of first electrode plate unwinding apparatus 12 corresponding to the loading station A, at least one second electrode plate provided by at least one second electrode plate unwinding apparatus 13 and a plurality of separators provided by a plurality of separator unwinding apparatuses 14, to form an electrode assembly with a winding structure. After winding is finished, the switching apparatus 111 moves the winding core 112 with an electrode assembly to the unloading station B to facilitate unloading of the electrode assembly. The unloading herein refers to conveying the winding core 112 with an electrode assembly to the next process, the next process can be the next process in the winding process, such as tape attaching, and can also be the next process after winding, such as hot pressing. If the switching apparatus 111 is further provided with at least other winding core 112, then the other winding core 112 is moved to the loading station A to continuously form another electrode assembly with a winding structure.

For example, as shown in FIG. 4, the switching apparatus 111 is provided with two winding cores 112, the position corresponding to the winding core 112 is provided with a loading station A and an unloading station B. The switching apparatus 111 includes a rotating disc, the two winding cores 112 are distributed along the circumference of the switching apparatus 111, and the two winding cores 112 are distributed on a diameter of the switching apparatus 111 and symmetrically with a center of a rotating shaft of the switching apparatus 111.

Figure 5:
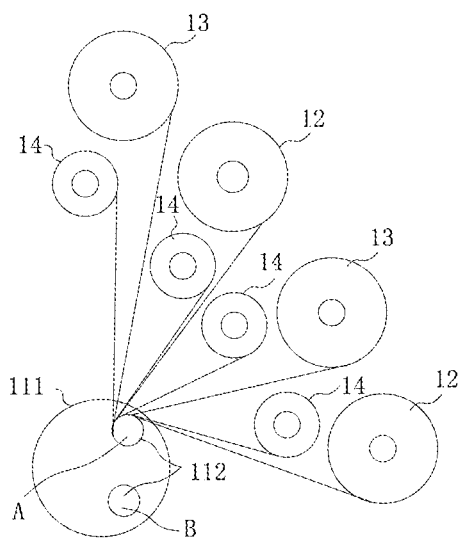
FIG. 5 is a schematic diagram of a device for preparing an electrode assembly provided in a fifth embodiment of the present application.

As shown in FIG. 5, the two winding cores 112 are distributed on different diameters of the switching apparatus 111 with the rotating shaft of the switching apparatus 111 as a center, and the switching apparatus 111 moves one of the winding cores 112 to the loading station A to wind the first electrode plate, the second electrode plate and the separator corresponding to the loading station A to form an electrode assembly with a winding structure. After winding is finished, the switching apparatus 111 continues to rotate, to move the winding core 112 with an electrode assembly to the unloading station B to facilitate unloading of the electrode assembly, and moves the other winding core 112 to the loading station A to form another electrode assembly with a winding structure.

Figure 6:
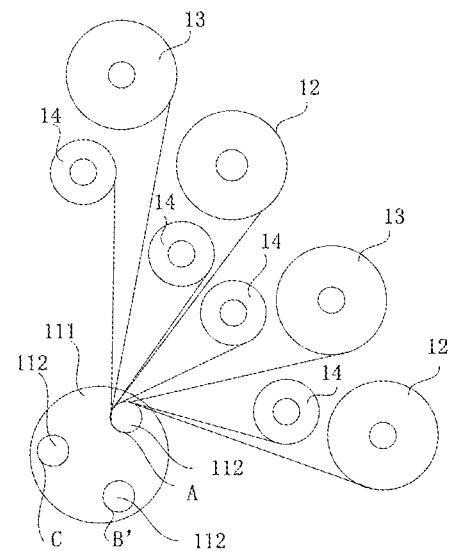
FIG. 6 is a schematic diagram of a device for preparing an electrode assembly provided in a sixth embodiment of the present application.

For example, as shown in FIG. 6, the switching apparatus 111 includes a rotating disc, the switching apparatus 111 is provided with three winding cores 112, and the three winding cores 112 are distributed along the circumference of the switching apparatus 111, for example, the three winding cores 112 are distributed on the circumference of the switching apparatus 111 in an equiangular manner, the switching apparatus 111 moves one of the winding cores 112 to the loading station A to wind the first electrode plate, the second electrode plate and the separator corresponding to the loading station A to form the electrode assembly with the wind structure. After winding is finished, the switching apparatus 111 continues to rotate, the winding core 112 with the electrode assembly is moved to the tape attaching station B' to be attached with an ending tape, and the winding core 112 with an electrode assembly after being attached with an ending tape is moved to the unloading station C, to facilitate taking down of the electrode assembly. The unloading station includes a tape attaching station B' and an unloading station C.

When the winding core 112 with an electrode assembly is moved to the tape attaching station B', the other winding core 112 is moved to the loading station A, to form another electrode assembly with a winding structure, while the last winding core 112 is at an unloading station C, and serves as a standby winding core 112 to wait for the rotation of the switching apparatus 111 to enter the loading station A.

That is to say, the station at which the last winding core 112 is located can serve as a standby station, and can also serve as an unloading station C when an electrode assembly is arranged on the winding core 112. That is, the switching apparatus 111 rotates to move the winding core 112 with the electrode assembly to the unloading station C to unload, that is, to unload the electrode assembly. After the winding core 112 with an electrode assembly is unloaded at the unloading station C, an empty winding core 112 can be placed at the unloading station C, to wait for entering the loading station A.

Figure 7:
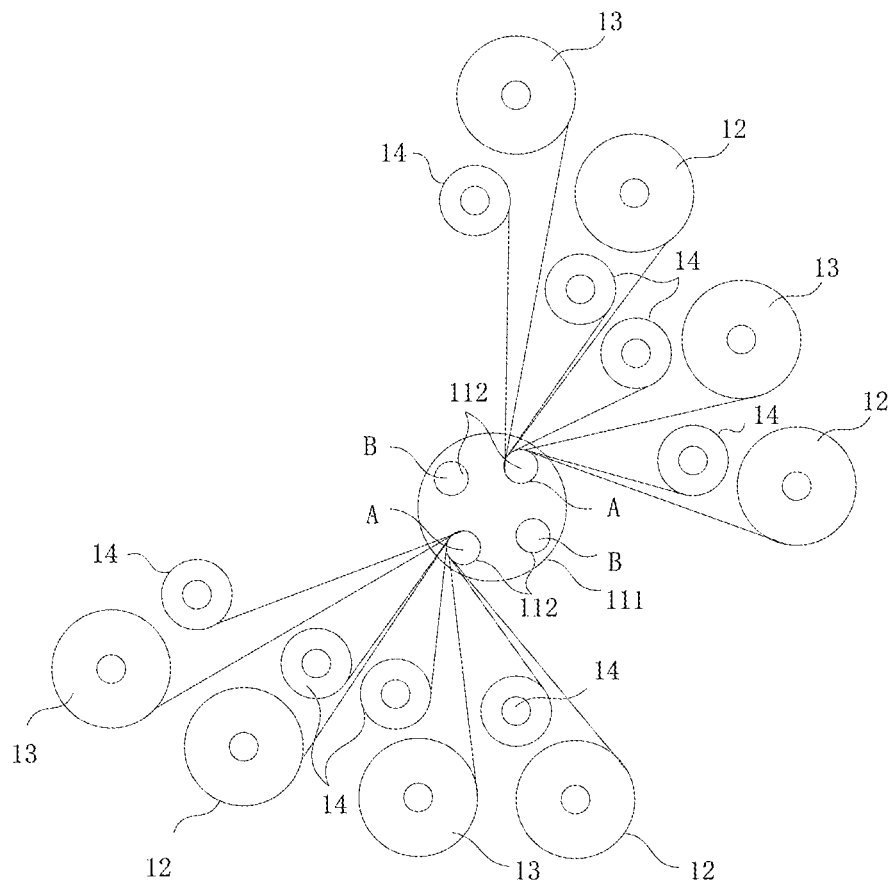
FIG. 7 is a schematic diagram of a device for preparing an electrode assembly provided in a seventh embodiment of the present application.

In another embodiment of the present application, the position corresponding to the winding core 112 can be provided with two or more loading stations A, for example, as shown in FIG. 7, the position corresponding to the winding core 112 is provided with two loading stations A, then the switching apparatus 111 can move the winding cores 112, with the same number as the loading stations A, to their respective loading stations A. The winding core 112 corresponding to each loading station A is wound to form electrode assemblies with a winding structure with the same number as the loading stations A, then each loading station A corresponds to a set of loading systems composed of a plurality of first electrode plate unwinding apparatuses 12, at least one second electrode plate unwinding apparatus 13 and a plurality of separator unwinding apparatuses 14. In the present embodiment, the number of the unloading stations B is not limited, for example, the number of the unloading stations B can be one, and can also be the same as the number of the loading stations A.

In another embodiment of the present application, as shown in FIG. 8, the device for preparing the electrode assembly further includes a first cutter 151 and a second cutter 152, wherein the first cutter 151 is configured to cut off at least one separator in the a plurality of separators and retaining at least one separator when the winding core 112 winds the electrode assembly for a predetermined number of turns; and the second cutter 152 is configured to cut off the at least one retained separator when the winding core 112 is at the unloading station B (can be attached with tape at the station).

In still another embodiment of the present application, each loading station A corresponds to one first cutter 151 and one second cutter 152. For example, one first cutter 151 and one second cutter 152 can be arranged aiming at each loading station A, when the winding core 112 corresponding to any arbitrary loading station A (for example, the first loading station) winds the electrode plates in the wound electrode assembly to a predetermined number of turns, the first cutter 151 corresponding to the loading station A (for example, the first loading station) cuts off other separators entering the loading station A (for example, the first loading station) on the basis of retaining at least one separator, for example, retaining the separator on the outermost layer of the winding structure of the electrode assembly and cutting off all the other separators. The winding to a predetermined number of turns herein means that the length at which the first electrode plate or the second electrode plate winds to the winding core reaches the length required by the electrode assembly.

The second cutter 152 is configured to cut off the at least one retained separator arranged between the loading station A (for example, the first loading station) and the loading station B (for example, the first unloading station) after the at least one retained separator is successfully loaded again at the loading station A (for example, the first loading station). For example, when the switching apparatus 111 transfers the winding core 112 corresponding to the first loading station to first unloading station, since the electrode assembly of the winding core 112 on the first loading station also retains at least one separator, the friction effect between the retained separator and the adjacent first electrode plate and the second electrode plate or the separator and the friction effects between the first electrode plate and the separator and between the second electrode plate and the separator are utilized, and the retained separator can drive all the first electrode plates, second electrode plates and other separators to load at the loading station A, after loading is finished, the second cutter 152 cuts off the at least one retained separator between the first loading station and the first unloading station, such that the winding core 112 which moves to the loading station A winds a new electrode assembly. The completion of loading at the loading station herein means that the other cut-off separators are completely wound to the winding core, and the winding core 112 moves to the unloading station along with the switching apparatus, at this time, the one retained separator is successfully loaded again, that is, the part, arranged at the loading station, of the one retained separator is fixed at the winding core at the loading station. After the part, arranged between the loading station and the unloading station, of the at least one retained separator is cut off by the second cutter 152, the tail end of the one retained separator is longer than the tail end of the corresponding first electrode plate or the second electrode plate, the winding core 112 at the unloading station rotates continuously, to wind the one retained separator and its corresponding first electrode plate or the second electrode plate to the outermost layer of the winding structure, to form an electrode assembly.

In another embodiment of the present application, the at least one retained separator includes at least one layer of separator calculated from the outermost layer of separator of the electrode assembly, for example, the separator of the electrode assembly can be called in sequence from outside to inside in the winding structure as follows: the outermost layer (that is, the first outer layer) of separator, the second outer layer of separator, the third outer layer of separator, . . . , the $n^{th}$ outer layer of separator, wherein n is related to the number of separators for separating the first electrode plate from the second electrode plate, for example, n is greater than or equal to the sum of the number of the first electrode plate and the second electrode plate, the separator at the outermost layer refers to the separator attached at the outer side of the outermost ring of electrode plates (generally the second electrode plates) of the winding structure, the outermost ring of electrode plate not only can be the electrode plate at the outermost layer after the winding structure is flattened, but also can be the electrode plate formed at the outermost ring of the winding structure when any arbitrary electrode plate in the winding structure continues to wind after other electrode plates finish winding.

In another embodiment of the present application, the first electrode plate and the second electrode plate are provided with an insulating layer, and no separator is required. When a plurality of first electrode plates and at least one second electrode plate are wound, the first cutter 151 is configured to cut off at least one electrode plate in the plurality of first electrode plates and at least one second electrode plate and retain at least one first electrode plate or one second electrode plate when the winding core winds the electrode assembly for a predetermined number of turns.

The second cutter 152 is configured to cut off the retained at least one first electrode plate or the second electrode plate when the winding core is at the unloading station.

In another embodiment of the present application, as shown in FIG. 9, the winding surface of each winding core 112 is provided with at least one negative pressure opening 1121 for adsorbing the winding initial section of at least one separator in the plurality of separators. For example, two or more negative pressure openings 1121 are generally available, and at least one negative pressure opening 1121 is configured to adsorb the separator for loading of the winding core 112 to which the at least one negative pressure opening 1121 belongs. The winding initial section refers to the head part of the separator at the beginning of the winding.

In some other embodiments of the present application, the first electrode plates and the second electrode plates are provided with an insulating layer and no separator is required. When a plurality of first electrode plates and at least one second electrode plate are wound, the at least one negative pressure opening 1121 arranged at the winding surface of the winding core 112 is configured to adsorb at least one electrode plate in the plurality of first electrode plates or the at least one second electrode plate.

In another embodiment of the present application, the negative pressure opening 1121 includes pits or through holes arranged on the winding surface of the winding core 112, the size and shape of the pits or through holes are not limited in the present embodiment, for example, the pits or through holes can be circular pits or through holes, or can be triangular pits or through holes, or can be square pits or through holes.

In still another embodiment of the present application, the negative pressure opening 1121 can be triangular, circular, square or of other irregular shapes.

In still another embodiment of the present application, the negative pressure openings 1121 are distributed in an array on the winding surface of the winding core 112. Array distribution of the negative pressure opening 1121 ensures uniform adsorption force exerted on the separator, and ensures flatness of the separator or electrode plate (the first electrode plate or the second electrode plate) during winding.

In still another embodiment of the present application, as shown in FIG. 10, the device for preparing the electrode assembly further includes a press roller 161 and a spraying and blowing mechanism 162, the press roller 161 is configured to press the winding initial section of the at least one separator in the a plurality of separators towards the winding core; the spraying and blowing mechanism 162 is configured to blow an end part of the winding initial section onto the surface of the winding core, such that the winding core winds the winding initial section, to drive the a plurality of first electrode plates, the at least one second electrode plate and the a plurality of separators to be wound. Each loading station A corresponds to one press roller 161 and one spraying and blowing mechanism 162, the press roller 161 is configured to press the winding initial section of at least one separator in a plurality of separators of the corresponding loading station A (for example, the first loading station) towards the winding core 112 corresponding to the corresponding loading station A (for example, the first loading station). The spraying and blowing mechanism 162 is configured to blow an end part of the winding initial section of the at least one separator onto the winding surface of the winding core 112 corresponding to the corresponding loading station A (for example, the first loading station), such that the winding initial section of the winding core 112 on the corresponding loading station A (for example, the first loading station) winds, to drive a plurality of first electrode plates, at least one second electrode plate and a plurality of separators corresponding to the corresponding loading station A (for example, the first loading station) to wind to form an electrode assembly with a winding structure.

In some other embodiments of the present application, as shown in FIG. 10, the first electrode plates and the second electrode plates are provided with an insulating layer, and no separator is required, when a plurality of first electrode plates and at least one second electrode plate are wound, the press roller 161 is configured to press the winding initial section of at least one electrode plate in the a plurality of first electrode plates and at least one second electrode plate towards the winding core; and the spraying and blowing mechanism 162 is configured to blow the end part of the winding initial section onto the surface of the winding core, such that the winding core winds the winding initial section, to drive the a plurality of first electrode plates and the at least one second electrode plate to be wound.

In another embodiment of the present application, as shown in FIG. 11, the device for preparing the electrode assembly further includes a loading assembly 17. Each loading station A can correspond to one loading assembly 17. The loading assembly 17 is configured to feed the winding initial section of at least one separator entering the loading station A (for example, the first loading station) corresponding to the loading assembly 17 into the winding surface of the winding core 112 corresponding to the corresponding loading station A (for example, the first loading station). The loading assembly 17 is further configured to clamp a tail section of the separator after the electrode plates in the electrode assembly are wound to a predetermined number of turns and the separator is cut off, and to clamp the winding initial section of the separator, at the loading assembly 17, of the next pre-formed electrode assembly.

Figure 12:
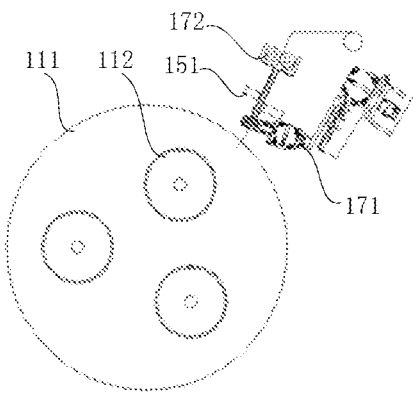
FIG. 12 is a schematic diagram of a loading assembly provided in some embodiments of the present application.

As shown in FIG. 12, the loading assembly 17 includes a first loading piece 171, and the first loading piece 171 is configured to feed the winding initial section of the at least one separator into the winding core 112. The first loading piece 171 is configured to feed the winding initial section of at least one separator, entering the loading station A (for example, the first loading station) corresponding to the first loading piece 171, into the winding surface of the winding core 112 corresponding to the corresponding loading station A (for example, the first loading station). The first loading piece 171 is further configured to clamp a tail section of the separator after the electrode plates in the electrode assembly are wound to a predetermined number of turns and the separator is cut off.

The loading assembly 17 further includes a second loading piece 172, and the second loading piece 172 is configured to clamp a winding initial section of the separator of the next pre-formed electrode assembly at the loading assembly 17 after the electrode plates in the electrode assembly are wound to a predetermined number of turns and the separator is cut off. The first cutter 151 is arranged between the first loading piece 171 and the second loading piece 172.

For example, as shown in FIG. 12, the loading assembly 17 includes a first loading piece 171 and a second loading piece 172, and the first cutter 151 is arranged between the first loading piece 171 and the second loading piece 172. The first loading piece 171 is configured to clamp the winding initial section of the separator of the corresponding loading station, and feed the winding initial section into the winding core 112. After the first cutter 151 cuts off the separator, the first loading piece 171 clamps the winding tail section of the separator, and moves the winding tail section of the separator to the winding core 112, and the second loading piece 172 is configured to clamp the winding initial section of the separator of the electrode assembly pre-formed subsequently.

In another embodiment of the present application, the first electrode plate and the second electrode plate are provided with an insulating layer and no separator is required. When a plurality of first electrode plates and at least one second electrode plate are wound, the first loading piece 171 is configured to clamp the winding initial section of at least one electrode plate in the plurality of first electrode plates and at least one second electrode plate, and feed the winding initial section into the winding core 112. The second loading piece 172 is configured to clamp the cut-off at least one first electrode plate or second electrode plate when the at least one first electrode plate or the second electrode plate in the plurality of first electrode plates and at least one second electrode plate is cut off.

In still another embodiment of the present application, each loading assembly 17 is arranged below the winding core 112 corresponding to the corresponding loading station A, to feed the separator from bottom to top into the winding core 112 corresponding to the loading station A. For example, the loading assembly 17 is arranged below the winding core 112 corresponding to the first loading station, and the loading assembly 17 is configured to feed the separator from bottom to top into the winding core 112 corresponding to the first loading station.

Figure 13:
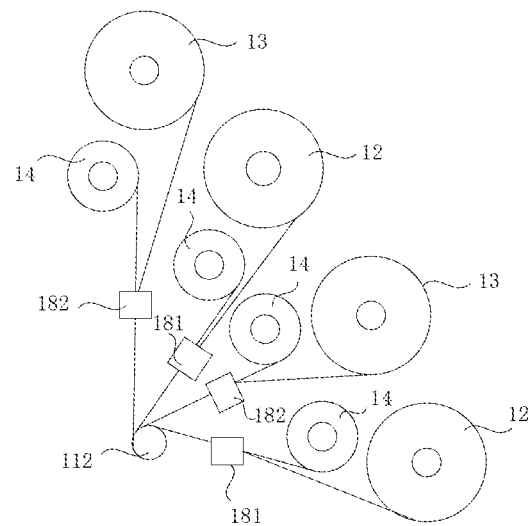
FIG. 13 is a schematic diagram of a device for preparing an electrode assembly provided with a compound mechanism provided in some embodiments of the present application.

In still another embodiment of the present application, as shown in FIG. 13, the device for preparing the electrode assembly further includes a plurality of first compound mechanisms 181 and at least one second compound mechanism 182, and each first compound mechanism 181 in the plurality of first compound mechanisms 181 is configured to compound one first electrode plate in the plurality of first electrode plates and one separator in the plurality of separators into a first compound electrode plate.

Each second compound mechanism 182 in at least one second compound mechanism 182 is configured to compound one second electrode plate in at least one second electrode plate and another separator in the plurality of separators into a second compound electrode plate.

The winding assembly 11 is configured to wind all the first compound electrode plates and all the second compound electrode plates to form an electrode assembly with a winding structure.

Figure 14:
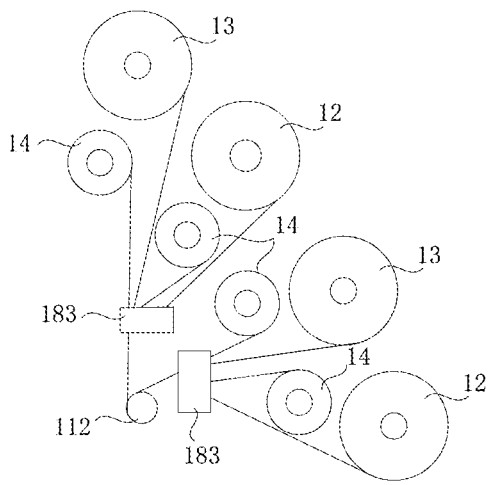
FIG. 14 is a schematic diagram of a device for preparing an electrode assembly provided with a compound mechanism provided in some other embodiments of the present application.

In another embodiment of the present application, as shown in FIG. 14, the device for preparing the electrode assembly further includes at least one third compound mechanism 183, each third compound mechanism 183 in at least one third compound mechanism 183 is configured to compound one first electrode plate in the plurality of first electrode plates, one second electrode plate in at least one second electrode plate and two separators in the plurality of separators into a third compound electrode plate, and the winding assembly 11 is configured to wind all the third compound electrode plates to form an electrode assembly with a winding structure.

Figure 15:
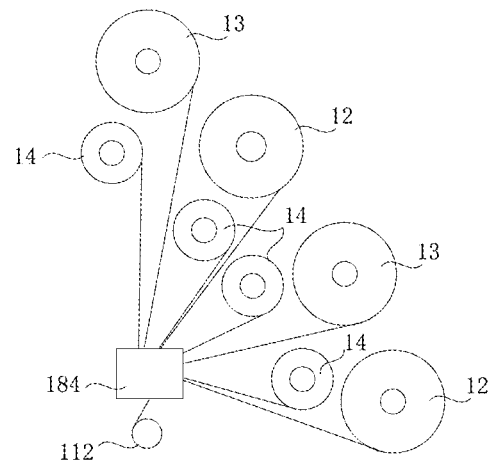
FIG. 15 is a schematic diagram of a device for preparing an electrode assembly provided with a compound mechanism provided in still some other embodiments of the present application.

In still another embodiment of the present application, as shown in FIG. 15, the device for preparing the electrode assembly further includes a fourth compound mechanism 184, the fourth compound mechanism 184 is configured to compound the plurality of first electrode plates, at least one second electrode plate and the plurality of separators into a fourth compound electrode plate, and the winding assembly 11 is configured to wind the fourth compound electrode plate to form an electrode assembly with a winding structure.

According to the device for preparing the electrode assembly described above, as to the device for preparing the electrode assembly, the plurality of first electrode plates, at least one second electrode plate and the plurality of separators are wound to obtain an electrode assembly with a winding structure, that is, the plurality of first electrode plates and the plurality of second electrode plates are simultaneously wound on the winding assembly 11, the length of the electrode plates obtained when the winding assembly 11 winds for a turn is equivalent to the length of rotating for a plurality of turns by the winding assembly 11 when the winding assembly 11 winds one electrode plate, thereby reducing the number of winding turns, and improving the winding efficiency of the electrode assembly. Wherein the second electrode plate can be designed in a way that one second electrode plate corresponds to a plurality of first electrode plates.

In addition, compared with the electrode assembly obtained through winding with a single first electrode plate with the length being equal to the sum of a plurality of first electrode plates and a single second electrode plate with the length being equal to the sum of at least one second electrode plate to achieve the same energy, as to the electrode assembly prepared in the present embodiment, since the electrode assembly is formed through superimposed winding of a plurality of first electrode plates, at least one second electrode plate and a plurality of separators, that is, the electrode assembly prepared in the present embodiment is obtained through parallel winding after a single first electrode plate with the length being equal to the sum of lengths of a plurality of first electrode plates and a single second electrode plate with the length being equal to the sum of the lengths of at least one second electrode plate are respectively segmented into a plurality of pieces. A plurality of electrode plates with the same polarity are available inside the electrode assembly prepared in the present embodiment, the internal resistance of the electrode assembly is smaller, so as to reduce the calorific value of the electrode assembly in the using process, and improve the performance of the electrode assembly.

In addition, compared with the condition in which a single first electrode plate with a length being equal to the sum of lengths of a plurality of first electrode plates and a single second electrode plate with the length being equal to the sum of at least one second electrode plate are wound to achieve the same energy, during winding, a plurality of tabs with the same polarity should be controlled to be aligned, to ensure electrical connection after the subsequent electrode assembly is assembled into a battery. To ensure alignment of the tabs, the position of the tab is calculated according to the winding radius corresponding to the tab, therefore, the more the number of winding turns is, the larger the changes of the winding radius is, the more difficult the precise calculation of positions between the tabs is, and the more difficult the control of misplacement of the tab (that is, the misalignment degree of the tab) is. In the electrode assembly of the present embodiment, the length of the electrode plate is shortened, and the number of winding turns is reduced, thereby improving the capability of controlling misplacement of the tab in the winding process, and improving the quality of the electrode assembly.

To simplify description, the following embodiments will be described with one winding assembly, two first electrode plate unwinding apparatuses and two second electrode plate unwinding apparatuses as an example.

Figure 16:
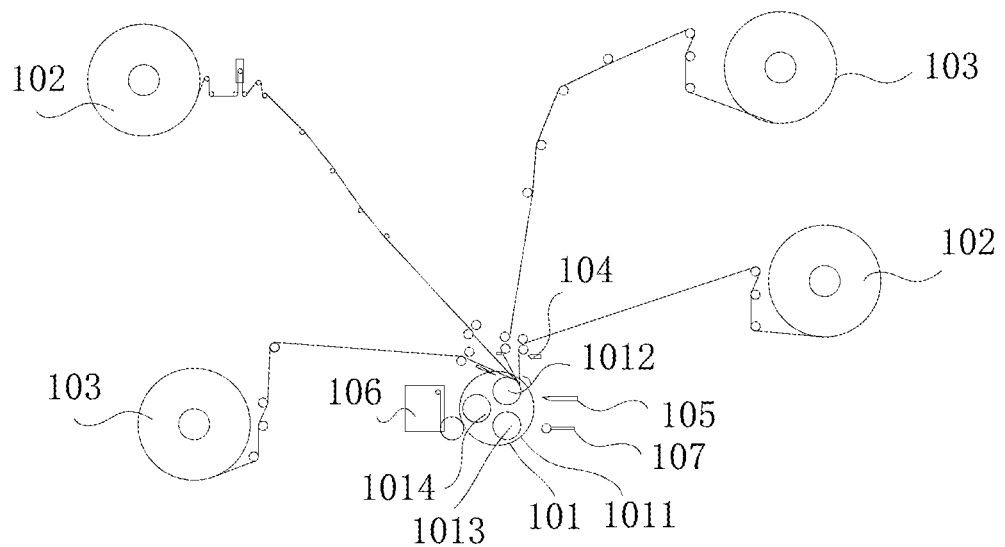
FIG. 16 is a schematic diagram of a device for preparing an electrode assembly provided in a first embodiment of the present application.

FIG. 16 is a structural schematic diagram of a device for preparing an electrode assembly provided in a first embodiment of the present application. In the first embodiment, the device for preparing the electrode assembly includes a winding assembly 101, two first electrode plate unwinding apparatuses 102 and two second electrode plate unwinding apparatuses 103.

Two first electrode plate unwinding apparatuses 102 are configured to provide two first electrode plates for the winding assembly 101.

Two second electrode plate unwinding apparatuses 103 are configured to provide two second electrode plates for the winding assembly 101.

The winding assembly 101 is configured to superimpose two first electrode plates and two second electrode plates and wind to an electrode assembly with a winding structure. The electrode assembly includes one first electrode plate, one second electrode plate, another first electrode plate and another second electrode plate which are superimposed along a direction vertical to a winding axial direction of the winding structure.

The polarity of the first electrode plate is opposite to the polarity of the second electrode plate, and the first electrode plate and the second electrode plate are both provided with an insulating layer, and the first electrode plate is separated from the second electrode plate through an insulating layer, to prevent short circuit.

For example, the first electrode plate is a positive electrode plate with an insulating layer, and the second electrode plate is a negative electrode plate with an insulating layer. Or, the first electrode plate is a negative electrode plate with an insulating layer, and the second electrode plate is a positive electrode plate with an insulating layer.

The winding assembly 101 includes a switching apparatus 1011, the switching apparatus 1011 is provided with three winding cores, to distinguish, the three winding cores are respectively defined as a first winding core 1012, a second winding core 1013 and a third winding core 1014, and the first winding core 1012, the second winding core 1013 and the third winding core 1014 are arranged at intervals along a rotating axis of the switching apparatus 1011. A first station, a second station and a third station are arranged along a circumferential direction of the switching apparatus 1011. When the first winding core 1012 is arranged at the first station, the second winding core 1013 is arranged at the second station, the third winding core 1014 is arranged at the third station, the switching apparatus 1011 rotates. When the first winding core 1012 is arranged at the second station, the second winding core 1013 is arranged at the third station, the third winding core 1014 is arranged at the first station, and the switching apparatus 1011 rotates, and when the first winding core 1012 is arranged at the third station, the second winding core 1013 is arranged at the first station, and the third winding core 1014 is arranged at the second station, and so on.

Suppose that the first station is a loading station, the second station is a tape attaching station, and the third station is an unloading station. The second station and the third station can be combined into a station called an unloading station.

The winding core corresponding to the loading station winds the two first electrode plates and the two second electrode plates, to form an electrode assembly with a winding structure. The switching apparatus 1011 moves the winding core with an electrode assembly to a tape attaching station, an ending tape is attached, and finally, the switching apparatus 1011 moves the winding core with an electrode assembly to an unloading station, to facilitate unloading of the electrode assembly.

In the first embodiment, the device for preparing the electrode assembly further includes a first cutter 104 and a second cutter 105. The first cutter 104 is arranged at a loading station, and is configured to cut off other first electrode plates and second electrode plates on the basis of retaining at least one first electrode plate or second electrode plate when the winding core winds the electrode assembly for a predetermined number of turns.

The second cutter 105 is arranged between the first station and the second station, and the second cutter 105 is configured to cut off the retained at least one first electrode plate or second electrode plate when the winding core is arranged at the second station.

In the first embodiment, the winding surface of the winding core 112 can be provided with at least one negative pressure opening, to adsorb at least one electrode plate in the plurality of first electrode plates or the at least one second electrode plate.

In the first embodiment, the device for preparing the electrode assembly can further include a press roller and a spraying and blowing mechanism, when two first electrode plates and two second electrode plates are wound, the press roller is configured to press the winding initial section of at least one electrode plate in the two first electrode plates and the two second electrode plates towards the winding core; and the spraying and blowing mechanism is configured to blow an end part of the winding initial section onto the surface of the winding core, such that the winding core winds the winding initial section, to drive other first electrode plates and second electrode plates to be wound.

In the first embodiment, the device for preparing the electrode assembly further includes a tape preparing mechanism 106 and a tape attaching mechanism 107. The tape preparing mechanism 106 is configured to provide an ending tape for the tape attaching mechanism 107. The tape attaching mechanism 107 is arranged at the downstream of the loading station, that is, the second station, to attach an ending tape on the winding structure after the winding is finished.

The following embodiments will be described with one winding assembly, two first electrode plate unwinding apparatuses, two second electrode plate unwinding apparatuses and four separator unwinding apparatuses as an example.

Figure 17:
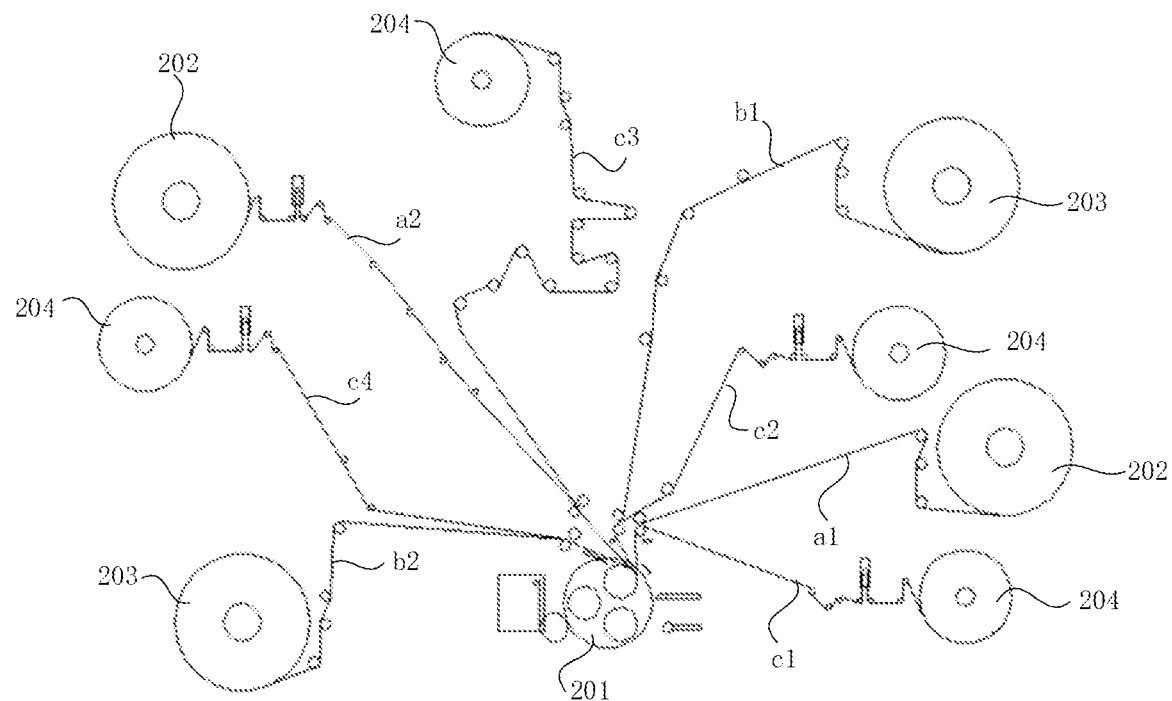
FIG. 17 is a schematic diagram of a device for preparing an electrode assembly provided in a second embodiment of the present application.

FIG. 17 is a structural schematic diagram of a device for preparing an electrode assembly provided in a second embodiment of the present application. In the second embodiment, the device for preparing the electrode assembly includes a winding assembly 201, two first electrode plate unwinding apparatuses 202, two second electrode plate unwinding apparatuses 203 and four separator unwinding apparatuses 204.

Two first electrode plate unwinding apparatuses 202 are configured to provide two first electrode plates a1 and a2 for the winding assembly 201.

Two second electrode plate unwinding apparatuses 203 are configured to provide two second electrode plates b1 and b2 for the winding assembly 201.

Four separator unwinding apparatuses 204 are configured to provide four separators c1, c2, c3 and c4 for the winding assembly 201.

The winding assembly 201 is configured to superimpose the pairing between the first separator c1 and one first electrode plate a1, the pairing between one second separator c2 and one second electrode plate b1, the pairing between one third separator c3 and another first electrode plate a2, and the pairing between the fourth separator c4 and another second electrode plate b2 and wind into an electrode assembly with a winding structure. The electrode assembly includes a first separator c1, a first electrode plate a1, a second separator c2, a second electrode plate b2, a third separator c3, another first electrode plate a2, a fourth separator c4 and another second electrode plate b2 which are alternately superimposed in sequence along a direction vertical to a winding axis direction vertical of the winding structure. That is, adjacent first electrode plate and second electrode plate are isolated through one separator.

As shown in FIG. 17 and FIG. 18, the winding assembly 201 includes a switching apparatus 210, the switching apparatus 210 is provided with three winding cores, to distinguish, the three winding cores are respectively defined as a first winding core 211, a second winding core 212 and a third winding core 213. A first station, a second station and a third station are arranged along a rotating direction of the switching apparatus 210. When the first winding core 211 is arranged at the first station, the second winding core 212 is arranged at the second station, the third winding core 213 is arranged at the third station. The switching apparatus 210 rotates, when the first winding core 211 is arranged at the second station, the second winding core 212 is arranged at the third station, the third winding core 213 is arranged at the first station, and the switching apparatus 210 rotates, and when the first winding core 211 is arranged at the third station, the second winding core 212 is arranged at the first station, and the third winding core 213 is arranged at the second station, and so on.

Suppose that the first station is a loading station, the second station is a tape attaching station, and the third station is an unloading station. The tape attaching station and the unloading station can be combined into an unloading station, that is, the unloading station includes a tape attaching station and an unloading station.

The first winding core 211, the second winding core 212 and the third winding core 213 are arranged at intervals along a rotating axis of the switching apparatus 210.

Of course, more than four winding cores can also be arranged on the switching apparatus 210, and each winding core operates in sequence at the loading station and the unloading station along with the rotation of the switching apparatus 210, to improve the operating efficiency.

In the present embodiment, the device for preparing the electrode assembly further includes a first cutter 221 and a second cutter 222.

The first cutter 221 is arranged at the position, corresponding to the first station, at the outer side of the switching apparatus 210, a knife holder 223 is arranged corresponding to the first cutter 221, and the first cutter 221 is matched with the knife holder 223 to cut off the separator. The second cutter 222 is arranged at the outer side of the switching apparatus 210, corresponding to the position between the first station and the second station.

When the first winding core 211 is arranged at the first station, the first winding core 211 receives two first electrode plates, two second electrode plates and four separators, and winds, after winding to a preset length, on the basis of retaining one separator, three other separators entering the first winding core 211 are cut off through the first cutter 221. When the first winding core 211 is arranged at the second station, one retained separator is cut off through the second cutter 222.

The first winding core 211 continuously rotates, to wind the one retained separator to an outermost layer of the winding structure. Optionally, the one retained separator is the innermost layer of separator of the electrode assembly, to take the innermost layer of separator of the electrode assembly as the retained separator to be finally wound to form an outermost layer of the electrode assembly, thereby avoiding the problem of lithium precipitation when the electrode assembly is applied to a battery caused by such phenomenon as end-part step when the retained separator encloses other separators and corresponding first electrode plates and second electrode plates.

In the present embodiment, the device for preparing the electrode assembly further includes a first group of loading assembly 231, a second group of loading assembly 232, a third group of loading assembly 233 and a fourth group of loading assembly 234.

The first group of loading assembly 231 feeds the winding initial section of the first separator c1 and the winding initial section of one first electrode plate a1 to the first winding core 211 corresponding to the loading station.

The second group of loading assembly 232 feeds the winding initial section of the second separator c2 and the winding initial section of one second electrode plate b1 to the first winding core 211 corresponding to the loading station.

The third group of loading assembly 233 feeds the winding initial section of the third separator c3 and the winding initial section of another first electrode plate a2 to the first winding core 211 corresponding to the loading station.

The fourth group of loading assembly 234 feeds the winding initial section of the fourth separator c4 and the winding initial section of another second electrode plate b2 to the first winding core 211 corresponding to the loading station.

In the present embodiment, the device for preparing an electrode assembly further includes a guide plate 240, the guide plate 240 is arranged at the loading station of the winding assembly 201, and the guide plate 240 is configured to guide the first electrode plate, the second electrode plate and the separator to the loading station of the winding assembly 201.

In the present embodiment, the device for preparing the electrode assembly further includes a tape preparing mechanism 251 and a tape attaching mechanism 252. The tape attaching mechanism 252 is arranged at the downstream of the loading station, corresponding to the tape attaching station of the unloading station, and is configured to attach an ending tape on the winding structure after the winding is finished. The tape preparing mechanism 251 is arranged at the downstream of the tape attaching station, that is, the third station, to provide an ending tape for the tape attaching mechanism 252.

When the first winding core 211 is arranged at the unloading station along with the movement of the switching apparatus 210, the tape attaching mechanism 252 attaches the ending tape to the winding structure, and the preparation of the electrode assembly is finished.

The operating process of the second winding core 212 and the third winding core 213 is the same as the operating process of the first winding core 211, which will not be repeated redundantly herein.

As shown in FIG. 19, the first group of loading assembly 231, the second group of loading assembly 232, the third group of loading assembly 233 and the fourth group of loading assembly 234 all include a first loading piece 2301 and a second loading piece 2302 which correspond mutually to cooperate to operate, a first cutter 221 is arranged between each first loading piece 2301 and its corresponding second loading piece 2302, a knife holder 223 is arranged correspondingly to the first cutter 221, and the first cutter 221 is matched with the knife holder 223 to cut off the separator.

The first loading piece 2301 is configured to clamp the winding initial section of the separator of the corresponding loading station, and feed the winding initial section into the first winding core 211. After the first cutter 221 cuts off the separator, the first loading piece 2301 clamps the tail end of the electrode assembly pre-formed antecedently, and moves the tail end of the separator to the first winding core 211, and the second loading piece 2302 is configured to clamp the winding initial section of the separator of the electrode assembly pre-formed subsequently.

The surfaces of the first winding core 211, the second winding core 212 and the third winding core 213 are all distributed with a plurality of small vacuum negative pressure opening 214. Each negative pressure opening 214 is configured to adsorb the separator, to be beneficial for smooth feeding.

FIG. 20 is a structural schematic diagram of a device for preparing an electrode assembly provided in a third embodiment of the present application. In the third embodiment, the device for preparing the electrode assembly includes a winding assembly 301, two first electrode plate unwinding apparatuses 302, two second electrode plate unwinding apparatuses 303 and four separator unwinding apparatuses 304.

Wherein the effects of the winding assembly 301, two first electrode plate unwinding apparatuses 302, two second electrode plate unwinding apparatuses 303 and four separator unwinding apparatuses 304 are similar to the effects of the winding assembly 201, two first electrode plate unwinding apparatuses 202, two second electrode plate unwinding apparatuses 203 and four separator unwinding apparatuses 204 in the second embodiment, which are not repeated redundantly herein.

The distinguishment between the third embodiment and the second embodiment can be at least as follows:

In the third embodiment, the device for preparing the electrode assembly further includes two first compound mechanisms 311 and two second compound mechanisms 312.

Each first compound mechanism 311 in the two first compound mechanisms 311 is configured to compound one first electrode plate in the two first electrode plates and one separator in the four separators into a first compound electrode plate.

The first compound mechanism 311 can connect the first electrode plate and the separator in a compounding manner through such compounding manners as electrostatic adsorption, hot-pressing compounding or tape attaching compounding. The first electrode plates and the separators are arranged in a stacking manner along a thickness manner of the first electrode plate.

Since two first electrode plate unwinding apparatuses 302 provide two first electrode plates, four separator unwinding apparatuses 304 provide four separators, and each first electrode plate and one separator are compounded through a first compound mechanism 311, therefore, two first compound electrode plates can be formed.

Each second compound mechanism 312 in two second compound mechanisms 312 is configured to compound one second electrode plate in two second electrode plates and another separator in four separators into a second compound electrode plate.

The second compound mechanism 312 can connect the second electrode plate and the separator in a compounding manner through such compounding manners as electrostatic adsorption, hot-pressing compounding or tape attaching compounding. The second electrode plates and the separators are arranged in a stacking manner along a thickness manner of the second electrode plate.

Since two second electrode plate unwinding apparatuses 303 provide two second electrode plates, four separator unwinding apparatuses 304 provide four separators, and each second electrode plate and one separator are compounded through a second compound mechanism 312, therefore, two second compound electrode plates can be formed.

The winding assembly 301 is configured to wind the two first compound electrode plates and two second compound electrode plates to form a winding structure.

Before the winding assembly 301 winds, the first electrode plate and the separator are compounded firstly through the first compound mechanism 311, such that the first electrode plate and the separator are connected with each other to form an overall first compound electrode plate, the second electrode plate and the separator are compounded through the second compound mechanism 312, such that the second electrode plate and the separator are connected with each other to form an overall second compound electrode plate, and then all the first compound electrode plates and second compound electrode plates are fed into the winding assembly 301 for winding.

On one aspect, the first electrode plates and the second electrode plates are respectively driven by their corresponding separator to enter the winding assembly 301 for winding. Relative to the manner in which the first electrode plates, the second electrode plates and the separators respectively enter the winding assembly 301 independently, the number of feeding layers of the loading station of the winding assembly 301 is reduced, thereby avoiding mutual interference caused by feeding in a plurality of layers, lowering the difficulty in alignment of the first electrode plates, the second electrode plates and the separators, lowering the possibility of misalignment of the first electrode plates and the second electrode plates, improving the winding alignment precision, facilitating operation, and improving efficiency. The alignment herein means that the first electrode plates, the second electrode plates and the separators are aligned with each other along their respective width directions.

On another aspect, the first electrode plates and the second electrode plates are respectively driven by their respective separators to enter the winding assembly 301 for winding, thereby lowering the possibility of crimping or folding when the first electrode plates and the second electrode plates enter the winding process, and effectively improving yield of the electrode assembly.

On still another aspect, the first electrode plates and the second electrode plates are respectively driven by their corresponding separators to enter the winding assembly 301 for winding. The number of feeding layers of the loading stations of the winding assembly 301 is reduced, correspondingly, the number of winding assisting mechanisms for guiding winding of each first electrode plate, second electrode plate and the separator at the loading station of the winding assembly 301 can be reduced, thereby simplifying the overall structure of the winding assembly 301, having enough space to set the assisting mechanism of each layer of feeding, and further being beneficial for improving the operating efficiency in winding.

The device for preparing the electrode assembly includes four heating pieces 320. The heating pieces 320 are configured to heat the separators provided by the separator unwinding apparatus 304.

Before the separators are fed into the compound mechanism, the separators are firstly heated through the heating piece 320, such that the separators are subjected to physical or chemical changes, then the separators are compounded with the first electrode plates, thereby being beneficial for better fit between the separators and the first electrode plates, improving the flatness of the formed first compound electrode plate, and lowering the possibility of separation of the first electrode plates from the corresponding separators.

One heating piece 320 in four heating pieces 320 is arranged between one separator unwinding apparatus 304 and one first compound mechanism 311. One heating piece 320 of four heating pieces 320 is arranged between one separator unwinding apparatus 23 and one second compound mechanism 312. The heating piece 320 is configured to heat the separators provided by the separator unwinding apparatus 23.

Before the separator is fed into the first compound mechanism 311 and the second compound mechanism 312, the separator is firstly heated through a heating piece 320, such that the separators are subjected to physical or chemical changes, then the separators are compounded with the second electrode plates, thereby being beneficial for better fit between the separators and the second electrode plates, improving the flatness of the formed second compound electrode plate, and lowering the possibility of separation of the second electrode plates from the corresponding separators.

In the third embodiment, the device for preparing the electrode assembly further includes a third cutter 331, the third cutter 331 is arranged between the first electrode plate unwinding apparatus 302 and the first compound mechanism 311, and the third cutter 331 is configured to cut off the first electrode plate provided by the first electrode plate unwinding apparatus 302. The cut-off station of the first electrode plate is arranged at the upstream of the first compound mechanism 311 and is far away from the first compound mechanism 311, while the station at which the first electrode plate is compounded with the separator through the first compound mechanism 311 is far away from the station at which the winding assembly 301 winds, therefore, the first electrode plate is cut off at the upstream of the first compound mechanism 311, thereby further effectively lowering the possibility that the dust produced when the first electrode plate is cut off may enter the winding assembly 301, and lowering the risk of short circuit of the first electrode plate and the second electrode plate caused when the separator is pierced by dust existing in the winding assembly 301.

In the third embodiment, the device for preparing the electrode assembly further includes a fourth cutter 332, and the fourth cutter 332 is arranged between the second electrode plate unwinding apparatus 303 and the second compound mechanism 312, and is configured to cut off the second electrode plate provided by the second electrode plate unwinding apparatus 303. The station at which the second electrode plate is cut off is arranged at the upstream of the second compound mechanism 312, and is far away from the second compound mechanism 312, while the station at which the second electrode plate is compounded with the separator through the second compound mechanism 312 is far away from the station at which the winding assembly 301 winds, therefore, the second electrode plate is cut off at the upstream of the second compound mechanism 312, thereby further effectively lowering the possibility that the dust produced when the second electrode plate is cut off may enter the winding assembly 301, and lowering the risk of short circuit of the first electrode plate and the second electrode plate caused when the separator is pierced by dust existing in the winding assembly 301.

As shown in FIG. 21, in the third embodiment, the winding assembly 301 includes a rotating disc 3011 and three winding cores 3012, and the device for preparing the electrode assembly further includes a first cutter 351, a second cutter 352 and more than two loading assemblies 340.

The first cutter 351 is configured to cut off three separators, and the second cutter 352 is configured to cut off one separator. One of the loading assemblies 340 is configured to clamp one separator, and the other loading assembly 340 is configured to clamp the other three separators.

The loading assembly 340 is configured to feed the winding initial section of the separator entering the loading station corresponding to the loading assembly 340 into the winding core 3012 corresponding to the loading station, and the automation degree is high.

The loading assembly 340 is further configured to clamp a tail section of the first separator and clamp the winding initial section of the separator, at the loading assembly 340, of the next pre-formed electrode assembly after the winding structure winds to a predetermined number of turns and the first separator is cut off.

In the above embodiment, when the loading assembly 340 clamps the winding initial section or the winding tail section of the separator and feeds into the winding core 3012, a controllable tensile force can be provided to the winding initial section or the tail section of the separator, thereby lowering the possibility of such problems as displacement, bending and crimping when the winding initial section or the tail section enters the winding core 3012 caused when the winding initial section or the tail section is in a free suspension state, and improving the winding quality of the electrode assembly.

As shown in FIG. 22, optionally, the device for preparing the electrode assembly includes a press roller 361 and a spraying and blowing mechanism 362 corresponding to each loading station, wherein the press roller 361 is configured to press the winding initial sections of four separators towards the winding core 3012 corresponding to the loading station corresponding to the press roller 361, the spraying and blowing mechanism 362 is configured to blow the end part of the winding initial section of four separators onto the winding core 3012, such that the winding core 3012 winds the winding initial section of the separator, to drive two first electrode plates and two second electrode plates to form a winding structure.

FIG. 23 is a structural schematic diagram of a device for preparing an electrode assembly provided in a fourth embodiment of the present application. In the fourth embodiment, the device for preparing the electrode assembly includes a winding assembly 401, two first electrode plate unwinding apparatuses 402, two second electrode plate unwinding apparatuses 403 and four separator unwinding apparatuses 404.

Wherein the effects of the winding assembly 401, two first electrode plate unwinding apparatuses 402, two second electrode plate unwinding apparatuses 403 and four separator unwinding apparatuses 404 are similar to the effects of the winding assembly 301, two first electrode plate unwinding apparatuses 302, two second electrode plate unwinding apparatuses 303 and four separator unwinding apparatuses 304 in the third embodiment, which are not repeated redundantly herein.

The distinguishment between the fourth embodiment and the third embodiment can be at least as follows:

the device for preparing the electrode assembly further includes two first compound mechanisms 411, two second compound mechanisms 412 and two third compound mechanisms 413.

Each first compound mechanism 411 in the two first compound mechanisms 411 is configured to compound one first electrode plate in the two first electrode plates and one separator in the four separators into a first compound electrode plate.

Each second compound mechanism 412 in the two second compound mechanisms 412 is configured to compound one second electrode plate in the two second electrode plates and another separator in the four separators into a second compound electrode plate.

Each third compound mechanism 43 in the two third compound mechanisms 43 is configured to compound one first compound electrode plate and one second compound electrode plate to form a third compound electrode plate, and the winding assembly 401 is configured to wind each third compound electrode plate to form a winding structure.

In the fourth embodiment, the device for preparing the electrode assembly further includes a third cutter 421, and the third cutter 421 is arranged between the first electrode plate unwinding apparatus 402 and the first compound mechanism 411, and the third cutter 421 is configured to cut off the first electrode plate provided by the first electrode plate unwinding apparatus 402. The station at which the first electrode plate is cut off is arranged at the upstream of the first compound mechanism 411, and is far away from the first compound mechanism 411, while the station at which the first electrode plate is compounded with the separator through the first compound mechanism 411 is far away from the station at which the winding assembly 401 winds, therefore, the first electrode plate is cut off at the upstream of the first compound mechanism 411, thereby further effectively lowering the possibility that the dust produced when the first electrode plate is cut off may enter the winding assembly 401, and lowering the risk of short circuit of the first electrode plate and the second electrode plate caused when the separator is pierced by dust existing in the winding assembly 401.

In the fourth embodiment, the device for preparing the electrode assembly further includes a fourth cutter 422, and the fourth cutter 422 is arranged between the second electrode plate unwinding apparatus 403 and the second compound mechanism 412, and is configured to cut off the second electrode plate provided by the second electrode plate unwinding apparatus 403. The station at which the second electrode plate is cut off is arranged at the upstream of the second compound mechanism 412, and is far away from the second compound mechanism 412, while the station at which the second electrode plate is compounded with the separator through the second compound mechanism 412 is far away from the station at which the winding assembly 401 winds, therefore, the second electrode plate is cut off at the upstream of the second compound mechanism 412, thereby further effectively lowering the possibility that the dust produced when the second electrode plate is cut off may enter the winding assembly 401, and lowering the risk of short circuit of the first electrode plate and the second electrode plate caused when the separator is pierced by dust existing in the winding assembly 401.

In the fourth embodiment, the device for preparing the electrode assembly further includes a heating piece 440, and the heating piece 440 is configured to heat the separator.

Figure 24:
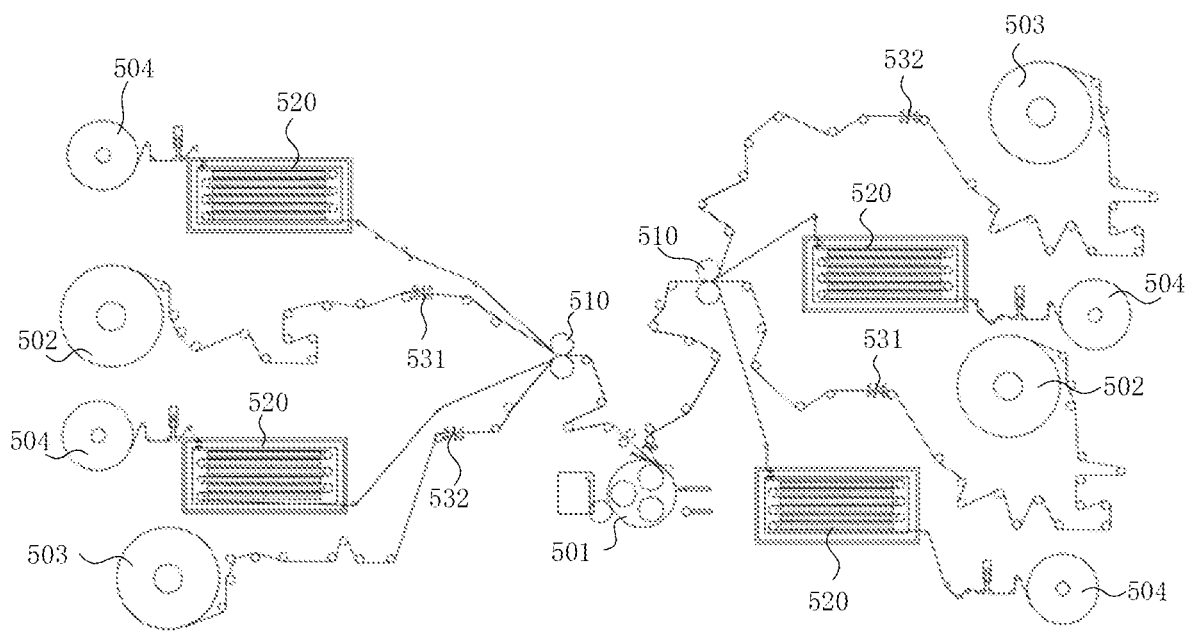
FIG. 24 is a schematic diagram of a device for preparing an electrode assembly provided in a fifth embodiment of the present application.

FIG. 24 is a structural schematic diagram of a device for preparing an electrode assembly provided in the fifth embodiment of the present application. In the fifth embodiment, the device for preparing the electrode assembly further includes a winding assembly 501, two first electrode plate unwinding apparatuses 502, two second electrode plate unwinding apparatuses 503, four separator unwinding apparatuses 504, two fourth compound mechanisms 510 and four heating pieces 520.

Wherein the effects of the winding assembly 501, two first electrode plate unwinding apparatuses 502, two second electrode plate unwinding apparatuses 503 and four separator unwinding apparatuses 504 are similar to the effects of the winding assembly 201, two first electrode plate unwinding apparatuses 202, two second electrode plate unwinding apparatuses 203 and four separator unwinding apparatuses 204 in the second embodiment, which are not repeated redundantly herein.

The fourth compound mechanism 510 is configured to compound one first electrode plate in two first electrode plates, one second electrode plate in two second electrode plates and two separators in a plurality of separators into a fourth compound electrode plate, and the winding assembly 501 is configured to wind all the fourth compound electrode plates to form a winding structure. Each heating piece 520 is arranged between a separator unwinding apparatus 504 and the fourth compound mechanism 510, to heat the separator.

The device for preparing the electrode assembly includes a third cutter 531 and a fourth cutter 532. The third cutter 531 is arranged between the first electrode plate unwinding apparatus 502 and the fourth compound mechanism 510, and the third cutter 531 is configured to cut off the first electrode plate provided by the first electrode plate unwinding apparatus 502. The fourth cutter 532 is arranged between the second electrode plate unwinding apparatus 505 and the fourth compound mechanism 510, and is configured to cut off the second electrode plate provided by the second electrode plate unwinding apparatus 505.

Figure 25:
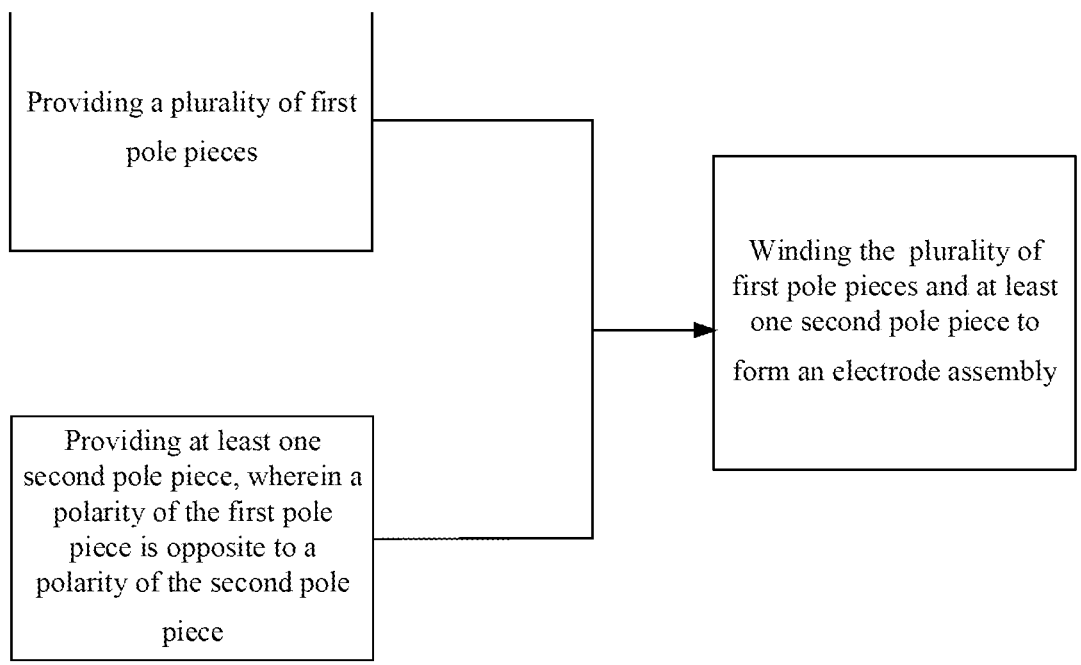
FIG. 25 is a flow diagram of a preparation method of an electrode assembly provided in some embodiments of the present application.

As shown in FIG. 25, some embodiments provide a preparation method of an electrode assembly, for the adopted device, please refer to FIG. 1 to FIG. 24, and for the preparation method of the electrode assembly, please refer to the operating process of all the device embodiments above. The preparation method of the electrode assembly includes:

providing a plurality of first electrode plates;

providing at least one second electrode plate, wherein a polarity of the first electrode plate is opposite to a polarity of the second electrode plate; and winding the plurality of first electrode plates and at least one second electrode plate to form an electrode assembly.

The preparation method of the electrode assembly can be consistent with the above process through which the device of the electrode assembly is prepared.

In the preparation method of the electrode assembly provided in the present application, a plurality of first electrode plates and at least one second electrode plate are wound to obtain an electrode assembly with a winding structure, that is, a plurality of first electrode plates and a plurality of second electrode plates are simultaneously wound on the winding assembly, the length of the electrode plates obtained after the winding assembly winds for a turn is equivalent to the length of rotation for at least two turns when the winding assembly winds one first electrode plate and one second electrode plate, therefore, the number of winding turns is reduced, and the winding efficiency of the electrode assembly is improved.

In addition, compared with the electrode assembly obtained through winding with a single first electrode plate with the length being equal to the sum of a plurality of first electrode plates and a single second electrode plate with the length being equal to the sum of at least one second electrode plate to achieve the same energy, as to the electrode assembly prepared in the present embodiment, since the electrode assembly is formed through superimposed winding of a plurality of first electrode plates and at least one second electrode plate, that is, the electrode assembly prepared in the present embodiment is obtained through parallel winding after a single first electrode plate with the length being equal to the sum of lengths of a plurality of first electrode plates and a single second electrode plate with the length being equal to the sum of the lengths of at least one second electrode plate are respectively segmented into a plurality of pieces. A plurality of electrode plates with the same polarity are available inside the electrode assembly prepared in the present embodiment, the internal resistance of the electrode assembly is smaller, so as to reduce the calorific value of the electrode assembly in the using process, and improve the performance of the electrode assembly.

In addition, compared with the alignment of a plurality of tabs on the electrode plates with the same polarity when a single first electrode plate with the length being equal to the sum of lengths of a plurality of first electrode plates and a single second electrode plate with the length being equal to the sum of at least one second electrode plate are wound to achieve the same energy, in the electrode assembly of the present embodiment, the tabs on a plurality of electrode plates with the same polarity are superimposed in parallel and are aligned before winding, moreover, the length of the electrode plate is shortened, the number of winding turns is reduced, therefore, the misplacement quantity of the tab is reduced, thereby improving the capability of controlling misplacement of the tab in the winding process, and improving the quality of the electrode assembly.

The preparation method of the electrode assembly provided in the present application further includes providing a plurality of separators, and the separators are configured to separate the first electrode plates from the second electrode plates.

The winding assembly is configured to wind a plurality of first electrode plates provided by a plurality of first electrode plate unwinding apparatuses, at least one second electrode plate provided by at least one second electrode plate unwinding apparatus and a plurality of separators provided by a plurality of separator unwinding apparatuses, to form at least one electrode assembly with a winding structure.

In some embodiments, in the preparation method of the electrode assembly, through adsorbing the winding initial section of at least one separator in a plurality of separators, a plurality of first electrode plates, at least one second electrode plate and a plurality of separators are wound.

In some embodiments, the preparation method of the electrode assembly further includes: after the winding initial section of at least one separator in a plurality of separators is fed into the winding core of the winding assembly for a certain length, the remaining separators in the plurality of separators are fed into the winding core and the remaining separators are driven by the at least one separator to be wound.

In some embodiments, the preparation method of the electrode assembly further includes: when the winding structure winds to a predetermined number of turns, on the basis of retaining at least one separator, each first cutter in the at least one first cutter cuts off other separators, at the first loading station, entering the winding structure.

After at least one retained separator is successfully fed at the loading station, each second cutter in at least one second cutter cuts off the at least one retained separator arranged between the first loading station and the first unloading station.

In some embodiments, each negative pressure opening in at least one negative pressure opening of each winding core adsorbs at least one separator in a plurality of separators.

In some embodiments, each first compound mechanism in a plurality of first compound mechanisms compounds one first electrode plate in the plurality of first electrode plates and one separator in the plurality of separators into a first compound electrode plate, each second compound mechanism in the at least one second compound mechanism compounds one second electrode plate in the at least one second electrode plate and another separator in the plurality of separators into a second compound electrode plate, and the winding assembly winds all the first compound electrode plates and all the second compound electrode plates to form an electrode assembly.

In an embodiment in which two first compound electrode plates and two second compound electrode plates are wound, after the winding initial section of a separator corresponding to one first compound electrode plate is fed into the winding core for a certain length, the winding initial sections of the separators of the remaining one first compound electrode plate and two second compound electrode plates are jointly fed into the winding core, and the remaining separators are driven to be wound by the separators of the first compound electrode plates which are fed antecedently.

In some embodiments, the preparation method of the electrode assembly includes: each third compound mechanism in at least one third compound mechanism is configured to compound one second electrode plate in a plurality of second electrode plates, one second electrode plate in at least one second electrode plate and two separators in a plurality of separators into a third compound electrode plate;

the winding assembly winds all the third compound electrode plates to form an electrode assembly.

In some embodiments, the preparation method of the electrode assembly includes: the fourth compound mechanism compounds a plurality of first electrode plates, at least one second electrode plate and a plurality of separators into a fourth compound electrode plate, and the winding assembly winds the fourth compound electrode plate to form an electrode assembly.

In some embodiments, an electrode assembly formed through winding of four electrode plates and four separators is taken as an example, to describe the preparation method of the electrode assembly, wherein four electrode plates are defined as electrode plate one, electrode plate two, electrode plate three and electrode plate four, and the preparation method of the electrode assembly includes:

the unwinding apparatus provides four separators and four electrode plates, that is, electrode plates one to four, and four separators are heated through a heating piece; the heated four separators and electrode plates one to four are respectively fed to corresponding compound mechanism, the compound mechanism form the separator and the electrode plate into a compound electrode plate, and after the length of the electrode plate satisfies set requirements, the electrode plate is cut off, the electrode plate in the unwinding apparatus waits for next release of the electrode plate.

The winding initial section of the compound electrode plate is a winding head of a separator compounded with no electrode plate, firstly the winding head of a separator of the compound electrode plate one, that is, the winding initial section of the separator, is firstly fed into the winding position of the winding core through a loading assembly, and the winding core at the first station adsorbs the separator to finish winding of the winding head.

The negative pressure opening arranged on the winding core can easily adsorb the winding head of the separator, after winding is stable, another loading assembly winds the compound electrode plates two to four with the compound electrode plate one jointly.

After winding of compound electrode plates two to four is finished, the separator at which the compound electrode plates two to four are located is cut off, the winding core switches from the first station to the second station, the separator corresponding to the compound electrode plate one is cut off, the compound electrode plate one is continuously wound by the winding core, and the compound electrode plate one ends by winding to the outermost layer of the electrode assembly, and an ending tape can be attached.

The winding core can switch to the third station, and when the winding core is at the third station, the electrode assembly on the winding core is disassembled.

Figure 26:
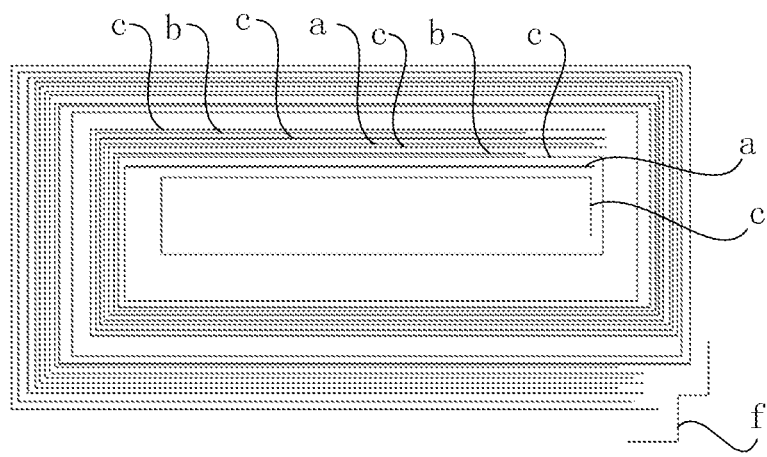
FIG. 26 is a schematic diagram of an electrode assembly provided in some embodiments of the present application.

In some embodiments, after the winding initial section of one separator c is fed into the winding core and wound for a certain length, the winding initial sections of the three remaining separators c are jointly fed into the winding core, the remaining separators are driven by the separators which are sent antecedently to be wound, and an ending tape f is attached after winding. In the embodiment in which two first electrode plates a, two second electrode plates b and four separators c are wound, the electrode assembly structure formed through the above winding method is as shown in FIG. 26.

Figure 27:
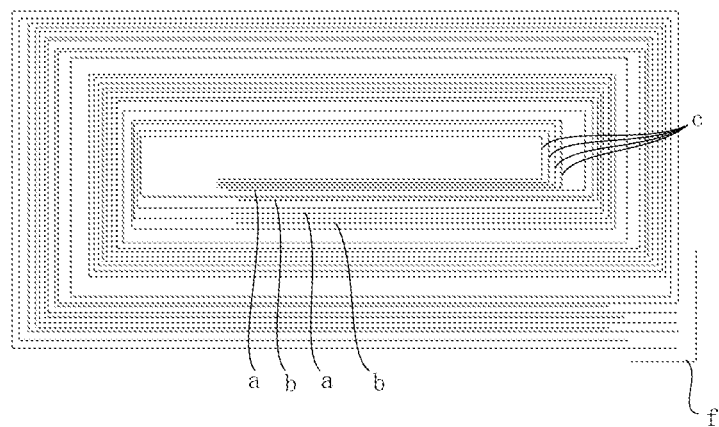
FIG. 27 is a schematic diagram of an electrode assembly provided in some other embodiments of the present application.

In some other embodiments, the winding initial sections of four separators c are jointly fed into the winding core for winding. In the embodiment in which two first electrode plates a, two second electrode plates b and four separators c are wound, the winding initial sections of four separators c are jointly fed into the winding core for winding, and an ending tape f is attached after winding, and the electrode assembly structure formed through the above winding method is as shown in FIG. 27.

Figure 28:
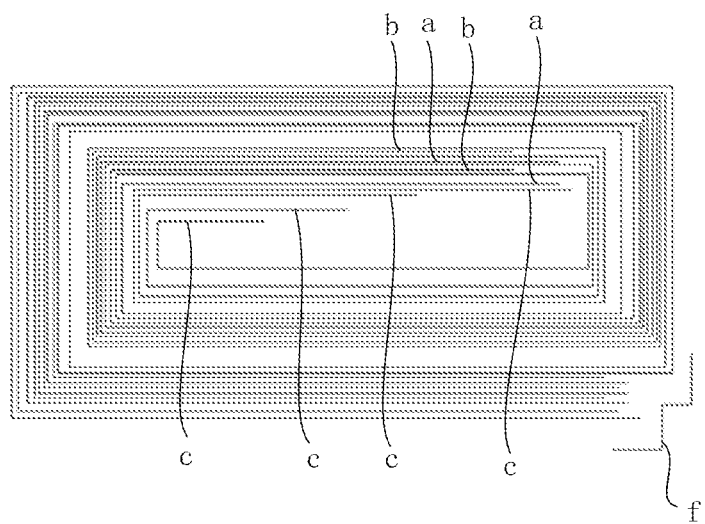
FIG. 28 is a schematic diagram of an electrode assembly provided in still some other embodiments of the present application.

In still some other embodiments, the winding initial sections of a plurality of separators c are fed into the winding core for winding in sequence, after the winding initial section of the front separator is fed into the winding core and is wound for a certain length, another separator in a plurality of separators is fed into the winding core, and the remaining separators in a plurality of separators are fed into the winding core for winding in sequence according to the above manner. In the embodiment in which two first electrode plates a, two second electrode plates b and four separators c are wound, firstly the winding initial section of the first separator is fed into the winding core for winding, after the first separator is wound for a certain length, the winding initial section of the second separator is fed into the winding core for winding, after the second separator is wound for a certain length, the winding initial section of the third separator is fed into the winding core for winding, after the third separator is wound for a certain length, the winding initial section of the fourth separator is fed into the winding core for winding, and an ending tape f is attached after winding, and the electrode assembly structure formed through the above winding method is as shown in FIG. 28.

The electrode assembly prepared with the device for preparing the electrode assembly and the preparation method of the electrode assembly provided in embodiments of the present disclosure can effectively reduce the internal resistance of the electrode assembly, and relieve such problems of large calorific value of the electrode assembly, existence of safety risks and shortened service life of the battery caused when the electrode assembly is charged and discharged at a high power. This electrode assembly can be used as consumer electrode assembly, power electrode assembly and energy-storage electrode assembly, etc.

In addition, the technical characteristics of one of the embodiments may be usefully combined with one or more of the other embodiments without explicit negation.

Finally, it should be noted that, the above embodiments are merely for illustrating the technical solutions of the present application, rather than for limiting the present application. Although the present application is described in detail with reference to preferred embodiments, those skilled in the art should understand that, specific embodiments of the present application can still be modified or part of the technical solutions can be equivalently substituted; while all the modifications or equivalent substitutions made without departing from the spirit of the technical solutions of the present application shall all fall within the scope of the technical solutions claimed in the present application.

The invention claimed is:

1. A device for preparing an electrode assembly, comprising:
    a winding assembly;
    a plurality of first electrode plate unwinding apparatuses, configured to provide a plurality of first electrode plates for the winding assembly;
    at least one second electrode plate unwinding apparatus, configured to provide at least one second electrode plate for the winding assembly, wherein a polarity of the first electrode plate is opposite to a polarity of the second electrode plate;
    a plurality of separator unwinding apparatuses configured to provide a plurality of separators for the winding assembly, the separators configured to isolate the first electrode plates from the second electrode plates, wherein the winding assembly comprises a winding core, and the winding core is configured to wind the plurality of first electrode plates, the at least one second electrode plate, and the plurality of separators, and wherein the winding assembly further comprises a switching apparatus, the winding core being arranged on the switching apparatus, and the switching apparatus being configured to switch the winding core between a first station and a second station;

a first cutter, arranged at the first station and configured to cut off some of the separators and retain at least one separator when the winding core winds the electrode assembly for a predetermined number of turns at the first station; and a second cutter, arranged between the first station and the second station and configured to cut off the at least one retained separator when the winding core is at the second station, wherein the winding assembly is configured to wind the plurality of first electrode plates and the at least one second electrode plate to form an electrode assembly, further comprising a tape attaching mechanism arranged at the second station and configured to attach an ending tape on the winding structure after the winding is finished.

2. The device for preparing an electrode assembly according to claim 1, wherein the winding core is provided with at least one negative pressure opening to adsorb a winding initial section of at least one separator in the plurality of separators; the at least one negative pressure opening comprises a concave hole or a penetrating hole arranged on a winding surface of the winding core; the at least one negative pressure opening is triangular, circular, square or of irregular shapes.

3. The device for preparing an electrode assembly according to claim 2, wherein the negative pressure openings are distributed in an array on the winding surface of the winding core.

4. The device for preparing an electrode assembly according to claim 1, further comprising:

a press roller, configured to press a winding initial section of at least one separator in the plurality of separators towards the winding core; and a spraying and blowing mechanism, configured to blow an end part of the winding initial section onto the surface of the winding core, such that the winding core winds the winding initial section, to drive the plurality of first electrode plates, the at least one second electrode plate and the plurality of separators to be wound.

5. The device for preparing an electrode assembly according to claim 1, further comprising a first loading piece configured to feed a winding initial section of at least one separator in the plurality of separators into the winding core.

6. The device for preparing an electrode assembly according to claim 5, further comprising a second loading piece configured to clamp at least one cut-off separator when at least one separator in the plurality of separators is cut off.

7. The device for preparing an electrode assembly according to claim 1, further comprising:

a plurality of first compound mechanisms, wherein each first compound mechanism in the plurality of first compound mechanisms is configured to compound one first electrode plate in the plurality of first electrode plates and one separator in the plurality of separators into a first compound electrode plate;

at least one second compound mechanism, wherein each second compound mechanism in the at least one second compound mechanism is configured to compound one second electrode plate in the at least one second electrode plate and another separator in the plurality of separators into a second compound electrode plate, and the winding assembly is configured to wind all the first compound electrode plates and all the second compound electrode plates to form an electrode assembly.

8. The device for preparing an electrode assembly according to claim 1, further comprising at least one third compound mechanism, and each third compound mechanism in the at least one third compound mechanism is configured to compound one first electrode plate in the plurality of first electrode plates, one second electrode plate in the at least one second electrode plate and two separators in the plurality of separators into a third compound electrode plate; and the winding assembly is configured to wind all the third compound electrode plates to form an electrode assembly.

9. The device for preparing an electrode assembly according to claim 1, further comprising a fourth compound mechanism configured to compound the plurality of first electrode plates, the at least one second electrode plate and the plurality of separators into a fourth compound electrode plate, and the winding assembly is configured to wind the fourth compound electrode plate to form an electrode assembly.

10. A preparation method of an electrode assembly with the device according to claim 1, the method comprising:

providing a plurality of first electrode plates;

providing at least one second electrode plate, wherein a polarity of the first electrode plate is opposite to a polarity of the second electrode plate; and winding the plurality of first electrode plates and at least one second electrode plate to form an electrode assembly.

11. The preparation method of an electrode assembly according to claim 10, further comprising: providing a plurality of separators, wherein the separators are configured to isolate the first electrode plate from the second electrode plate.

12. The preparation method of an electrode assembly according to claim 11, further comprising:

absorbing a winding initial section of at least one separator in the plurality of separators, and winding the plurality of first electrode plates, the at least one second electrode plate and the plurality of separators.

13. The preparation method of an electrode assembly according to claim 11, wherein after a winding initial section of at least one separator in the plurality of separators is fed into a winding core of a winding assembly for a certain length, remaining separators in the plurality of separators are fed into the winding core and driven by the at least one separator to be wound.

14. The preparation method of an electrode assembly according to claim 11, further comprising:

each first compound mechanism in a plurality of first compound mechanisms compounds one first electrode plate in the plurality of first electrode plates and one separator in the plurality of separators into a first compound electrode plate;

each second compound mechanism in at least one second compound mechanism compounds one second electrode plate in the at least one second electrode plate and another separator in the plurality of separators into a second compound electrode plate; and a winding assembly winds all the first compound electrode plates and all the second compound electrode plates to form an electrode assembly.

15. The preparation method of an electrode assembly according to claim 11, further comprising:
each third compound mechanism in at least one third compound mechanism compounds one first electrode plate in the plurality of first electrode plates, one second electrode plate in the at least one second electrode plate and two separators in the plurality of separators into a third compound electrode plate; and
a winding assembly winds all the third compound electrode plates to form an electrode assembly.

16. The preparation method of an electrode assembly according to claim 11, further comprising:
a fourth compound mechanism compounds the plurality of first electrode plate, at least one second electrode plate and the plurality of separators into a fourth compound electrode plate, and
a winding assembly winds the fourth compound electrode plate to form an electrode assembly.

* * * * *